US009804704B2

(12) United States Patent
Azumi et al.

(10) Patent No.: US 9,804,704 B2
(45) Date of Patent: *Oct. 31, 2017

(54) TOUCH DETECTING DEVICE, DISPLAY DEVICE WITH TOUCH DETECTING FUNCTION, AND ELECTRONIC APPARATUS

(71) Applicant: Japan Display Inc., Tokyo (JP)

(72) Inventors: Kohei Azumi, Tokyo (JP); Yoshitoshi Kida, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,728

(22) Filed: Mar. 1, 2017

(65) Prior Publication Data

US 2017/0177153 A1  Jun. 22, 2017

Related U.S. Application Data

(63) Continuation of application No. 14/335,529, filed on Jul. 18, 2014, now Pat. No. 9,619,088.

(30) Foreign Application Priority Data

Jul. 22, 2013 (JP) .................................. 2013-152139
Jul. 17, 2014 (JP) .................................. 2014-147217

(51) Int. Cl.
*G06F 3/045* (2006.01)
*G06F 3/044* (2006.01)
*G06F 3/041* (2006.01)

(52) U.S. Cl.
CPC ............ *G06F 3/0416* (2013.01); *G06F 3/044* (2013.01); *G06F 2203/04108* (2013.01)

(58) Field of Classification Search
CPC .... G06F 3/044; G06F 3/04886; G06F 3/0412; G06F 3/0416

(Continued)

(56) References Cited

U.S. PATENT DOCUMENTS 8,810,543 B1 8/2014 Kurikawa
8,947,392 B2 2/2015 Long et al.

(Continued)

FOREIGN PATENT DOCUMENTS

CN 102667692 9/2012
JP 2007-172028 7/2007
TW 201248463 12/2012

OTHER PUBLICATIONS

Office Action received in TW Patent 103124980, mailed Jan. 27, 2016, 12 pages.

(Continued)

*Primary Examiner* — Adam J Snyder
(74) *Attorney, Agent, or Firm* — K&L Gates LLP

(57) ABSTRACT

According to an aspect, a touch detecting device includes: a first drive area and a second drive area each including drive electrodes and detection electrodes, the drive electrodes extending in a first direction, being arrayed in a second direction intersecting with the first direction, and being applied with a drive signal, the detection electrodes extending in the second direction, being arrayed in the first direction, and outputting a detection signal. Application of the drive signal to the drive electrodes in the second drive area is stopped at a timing to apply the drive signal to the drive electrodes arranged in a first predetermined area included in the first drive area, and application of the drive signal to the drive electrodes in the first drive area is stopped at a timing to apply the drive signal to a second predetermined area included in the second drive area.

16 Claims, 24 Drawing Sheets

(58) Field of Classification Search
USPC .................................... 345/174; 178/18.06
See application file for complete search history.

(56) References Cited

U.S. PATENT DOCUMENTS

| | | |
|---|---|---|
| 2007/0138513 A1 | 6/2007 | Sato et al. |
| 2009/0267903 A1 | 10/2009 | Cady et al. |
| 2010/0066692 A1 | 3/2010 | Noguchi et al. |
| 2010/0110038 A1 | 5/2010 | Mo et al. |
| 2010/0156795 A1 | 6/2010 | Kim et al. |
| 2011/0134055 A1 | 6/2011 | Jung et al. |
| 2011/0141040 A1 | 6/2011 | Kang et al. |
| 2011/0148435 A1* | 6/2011 | Schwartz ............... G06F 3/044 324/658 |
| 2012/0229416 A1 | 9/2012 | Ku et al. |
| 2013/0265282 A1 | 10/2013 | Nakagawa et al. |

OTHER PUBLICATIONS

Chinese Office Action issued Nov. 30, 2016 in corresponding Chinese Application No. 201410348034.X.

* cited by examiner

FIG.9

| | DRIVING ORDER | BLOCK | | Vdet |
|---|---|---|---|---|
| INDE-PENDENT PORTION | 1 | L0 | R0 | OUT_L OUT_R |
| | 2 | L1 | R1 | |
| | 3 | L2 | R2 | |
| | 4 | L3 | R3 | |
| | 5 | L4 | R4 | |
| | 6 | L5 | R5 | |
| | 7 | L6 | R6 | |
| | 8 | L7 | R7 | |
| | 9 | L8 | R8 | |
| INTER-FERENCE PORTION | 10 | L9 | – | OUT_L + OUT_R |
| | 11 | L10 | – | |
| | 12 | L11 | – | |
| | 13 | – | R9 | |
| | 14 | – | R10 | |
| | 15 | – | R11 | |

TOUCH DETECTING DEVICE, DISPLAY DEVICE WITH TOUCH DETECTING FUNCTION, AND ELECTRONIC APPARATUS

CROSS REFERENCES TO RELATED APPLICATIONS

The present application is a continuation application of U.S. patent application Ser. No. 14/335,529, filed on Jul. 18, 2014, which application claims priority to Japanese Priority Patent Application JP 2013-152139 filed in the Japan Patent Office on Jul. 22, 2013, and Japanese Priority Patent Application JP 2014-147217 filed in the Japan Patent Office on Jul. 17, 2014, the entire content of which is hereby incorporated by reference.

BACKGROUND

1. Technical Field

The present application relates to a touch detecting device capable of detecting an object coming closer thereto from the outside, a display device with a touch detecting function, and an electronic apparatus.

2. Description of the Related Art

Touch detecting devices capable of detecting an object coming closer thereto from the outside, which are called touch panels, have been attracting attention in recent years. Such a touch detecting device is integrated with a display device, for example. By displaying various types of images or the like for input on the display device, the touch detecting device is used as a device for inputting information. Integrating a touch detecting device with a display device enables input of information without using an input device, such as a keyboard, a mouse, and a keypad.

Some types of technologies for touch detecting devices are known, including optical, resistive, and capacitive technologies. Capacitive touch detecting devices have a relatively simple structure and reduce power consumption. Touch detecting devices are required to detect approach or contact of an object as reliably as possible. Such a touch detecting device is described in Japanese Patent Application Laid-open Publication No. 2007-172028, for example.

In touch detecting devices, the detection sensitivity and the position detection accuracy have a trade-off relation with the detection speed (report rate). To increase the detection sensitivity, it is necessary to provide as many detection circuits as possible. To increase the position detection accuracy, it is necessary to provide as many electrodes as possible. Providing many detection circuits and electrodes may possibly increase a detection time and a drive time, thereby decreasing the detection speed.

For the foregoing reasons, there is a need for a touch detecting device, a display device with a touch detecting function, and an electronic apparatus that can maintain excellent detection sensitivity and excellent position detection accuracy in touch detection and increase the detection speed.

SUMMARY

According to an aspect, a touch detecting device includes: a first drive area and a second drive area each including a plurality of drive electrodes and a plurality of detection electrodes, the plurality of drive electrodes extending in a first direction, being arrayed in a second direction intersecting with the first direction, and being applied with a drive signal serving as a signal for detecting at least one of approach and contact of an object, the plurality of detection electrodes extending in the second direction, being arrayed in the first direction, and outputting a detection signal serving as a signal corresponding to a change in capacitance generated between the detection electrodes and the drive electrodes, the first drive area and the second drive area being arranged adjacent to each other in the second direction; a boundary between the first drive area and the second drive area adjacent to each other; and a first predetermined area included in the first drive area and a second predetermined area included in the second drive area. The first predetermined area and the second predetermined area face each other with the boundary interposed therebetween, and application of the drive signal to the drive electrodes arranged in the second drive area is stopped at a timing to apply the drive signal to the drive electrodes arranged in the first predetermined area, and application of the drive signal to the drive electrodes arranged in the first drive area is stopped at a timing to apply the drive signal to the second predetermined area.

According to another aspect, a display apparatus with a touch detecting function includes a touch detecting device. The touch detecting device includes: a first drive area and a second drive area each including a plurality of drive electrodes and a plurality of detection electrodes, the plurality of drive electrodes extending in a first direction, being arrayed in a second direction intersecting with the first direction, and being applied with a drive signal serving as a signal for detecting at least one of approach and contact of an object, the plurality of detection electrodes extending in the second direction, being arrayed in the first direction, and outputting a detection signal serving as a signal corresponding to a change in capacitance generated between the detection electrodes and the drive electrodes, the first drive area and the second drive area being arranged adjacent to each other in the second direction; a boundary between the first drive area and the second drive area adjacent to each other; and a first predetermined area included in the first drive area and a second predetermined area included in the second drive area; and a display device integrated with the touch detecting device. The first predetermined area and the second predetermined area face each other with the boundary interposed therebetween, and a direction of display scanning performed by the display device is different from a direction of touch detection scanning performed by the touch detecting device.

Additional features and advantages are described herein, and will be apparent from the following Detailed Description and the figures.

BRIEF DESCRIPTION OF THE FIGURES

FIG. 9 is a diagram illustrating a driving order of blocks of drive electrodes;

DETAILED DESCRIPTION

Exemplary aspects (embodiments) according to the present application are described in greater detail with reference to the accompanying drawings in the following order.
1. Embodiments
1-1. First embodiment
1-2. Second embodiment
1-3. Third embodiment
1-4. Fourth embodiment
1-5. Fifth embodiment
1-6. Sixth embodiment
2. Application examples
3. Aspects of the present application

1. EMBODIMENTS 1-1. First Embodiment

Figure 1:
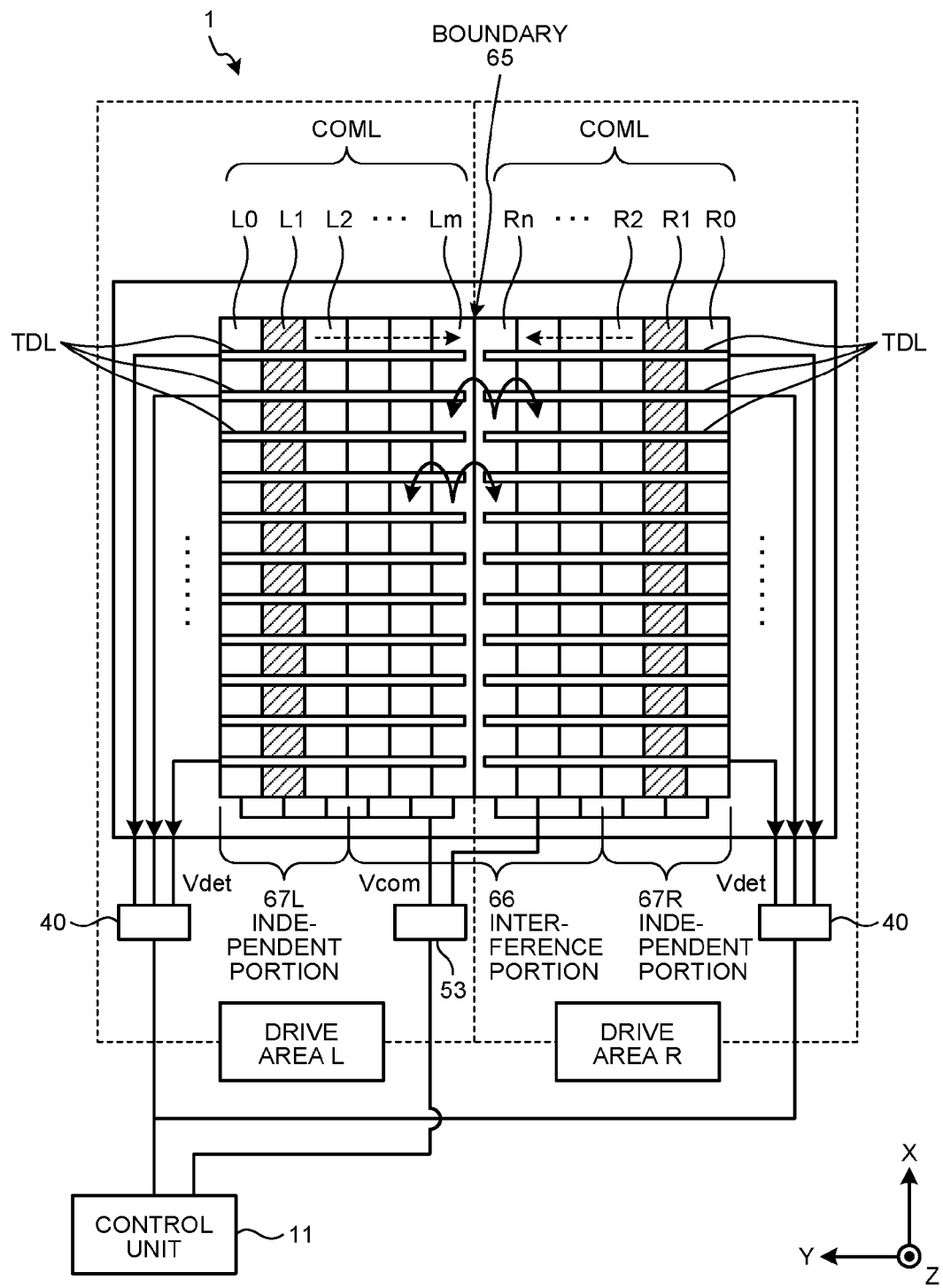
FIG. 1 is a schematic of a touch detecting device according to a first embodiment.
Figure 2:
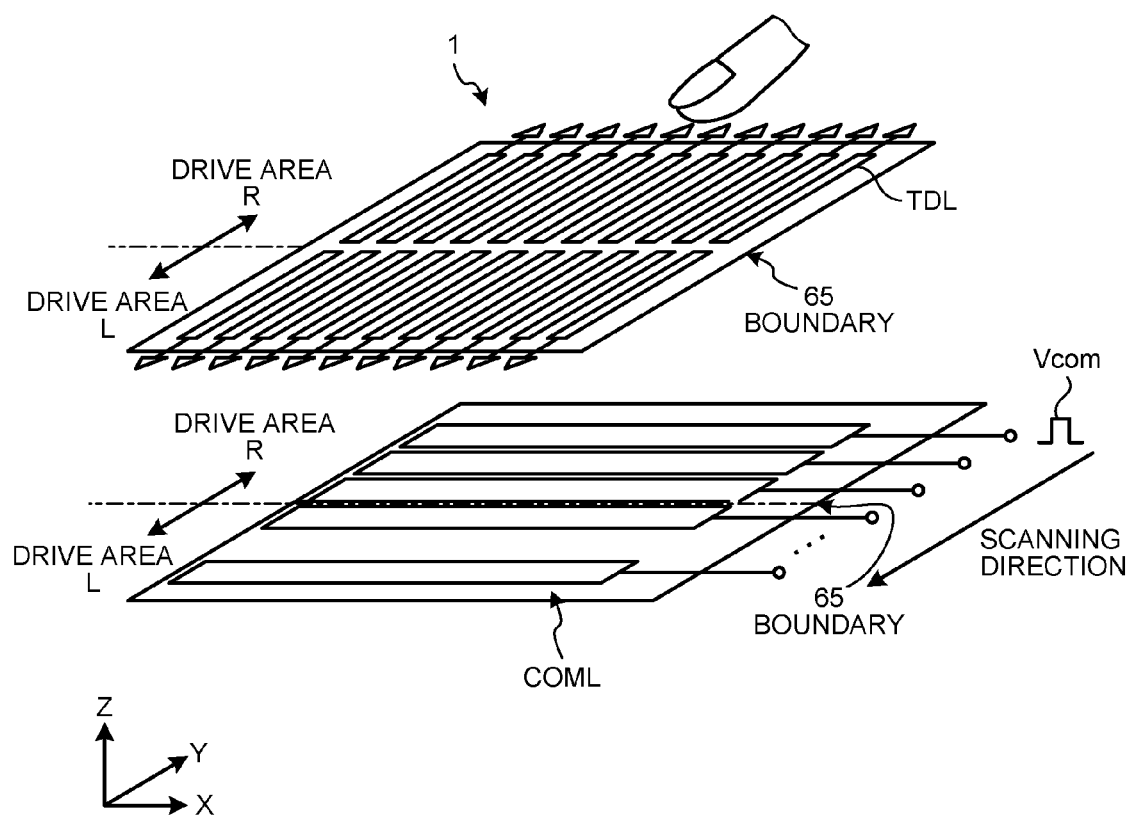
FIG. 2 is an exploded perspective view of the touch detecting device according to the embodiment.

FIG. 1 is a schematic of a touch detecting device according to a first embodiment. FIG. 2 is an exploded perspective view of the touch detecting device according to the embodiment. A touch detecting device 1 is what is called a capacitive touch detecting device. The touch detecting device 1 includes a plurality of drive electrodes COML and a plurality of touch detection electrodes TDL. The touch detection electrodes TDL are provided in a manner intersecting (including a grade separated intersection) with the drive electrodes COML. The drive electrodes COML are arranged on a plane. The touch detection electrodes TDL are arranged on a plane different from the plane on which the drive electrodes COML are arranged. The plane on which the drive electrodes COML are arranged and a plane parallel to the plane on which the drive electrodes COML are arranged are referred to as an X-Y plane. The X-Y plane is defined by the X-axis and the Y-axis, which are the coordinate axes. The X-axis and the Y-axis are orthogonal to each other. An axis orthogonal to the X-axis and the Y-axis is the Z-axis.

The drive electrodes COML extend in a first direction (the X-axis direction in the present embodiment) and are arrayed in a second direction (the Y-axis direction in the present embodiment) intersecting with the first direction. The drive electrodes COML are supplied with a drive signal Vcom serving as a signal for detecting at least one of approach and contact of an object. The drive signal Vcom is applied by a driving unit 53 electrically coupled to each of the drive electrodes COML. The driving unit 53 is controlled by a control unit 11. In the present embodiment, the first direction and the second direction are orthogonal to each other. These directions are not necessarily orthogonal to each other, and they simply need to intersect with each other.

The touch detection electrodes TDL extend in the second direction (the Y-axis direction in the present embodiment) and are arrayed in the first direction (the X-axis direction in the present embodiment). The touch detection electrodes TDL intersect with the drive electrodes COML with a predetermined gap interposed therebetween, that is, intersect with the drive electrodes COML in a grade separated manner. The touch detection electrodes TDL output a detection signal (hereinafter referred to as a touch detection signal) Vdet as a signal corresponding to a change in capacitance generated between the touch detection electrodes TDL and the drive electrodes COML. The first direction is hereinafter referred to as an X-direction, and the second direction is referred to as a Y-direction as needed.

In the present embodiment, the drive electrodes COML and the touch detection electrodes TDL each have a rectangular shape in a planar view, that is, viewed from the Z-axis direction. The drive electrodes COML have a larger dimension in the X-direction than that in the Y-direction. The touch detection electrodes TDL have a larger dimension in the Y-direction than that in the X-direction. The shapes of the drive electrodes COML and the touch detection electrodes TDL are not limited to a rectangle.

The capacitance is generated at portions where the drive electrodes COML and the touch detection electrodes TDL intersect with each other. The touch detection electrodes TDL are electrically coupled to an input unit of a touch detection processing unit 40. While the touch detection processing unit 40 is divided into two in FIG. 1 for convenience of the explanation, the number of touch detecting units 40 may be one or a plurality. The touch detection processing unit 40 is controlled by the control unit 11. A change in the capacitance at portions where the touch detection electrodes TDL and the drive electrodes COML intersect with each other is input to the touch detection processing unit 40 as the touch detection signal Vdet. Based on the touch detection signal Vdet, the touch detection processing unit 40 detects a portion where the capacitance changes out of the portions where the drive electrodes COML and the touch detection electrodes TDL intersect with each other. Based on the touch detection signal Vdet, the touch detection processing unit 40 identifies a position at which the object is in contact or in contiguity with the touch detecting device 1. Contact or contiguity of the object with the touch detecting device 1 is hereinafter referred to as a touch as needed.

In the present embodiment, the drive electrodes COML and the touch detection electrodes TDL intersect with each other in a grade separated manner. A touch is detected based on a change in the capacitance generated at a portion where the electrodes face each other. The position at which the capacitance is generated, however, is not limited to the portion where the electrodes face each other. In the touch detecting device 1, for example, conductors extracted from the drive electrodes COML and conductors extracted from the touch detection electrodes TDL may be arranged in a single plane to detect a touch based on capacitance generated between the conductors. In other words, the touch detecting device 1 simply needs to detect a touch based on the capacitance generated between the drive electrodes COML and the touch detection electrodes TDL. The following describes an example of the basic principle in that the touch detecting device 1 detects a touch.

Basic Principle of Capacitive Touch Detection

Figure 3:
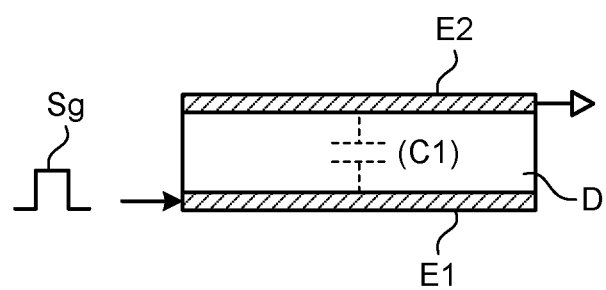
FIG. 3 is a view for explaining the basic principle of a capacitive touch detection technology and illustrates a state where no finger is in contact or in contiguity with the touch detecting device.
Figure 4:
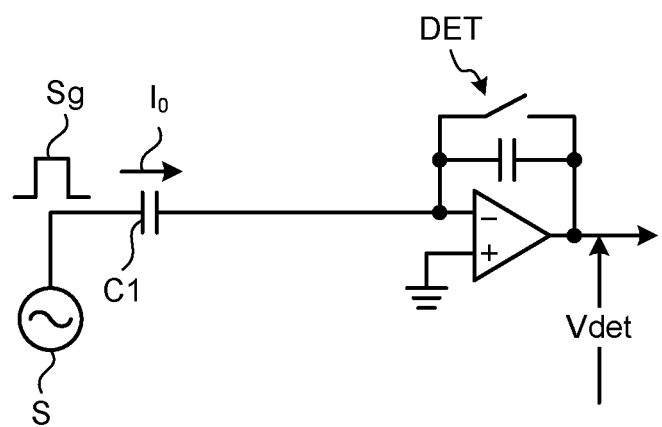
FIG. 4 is a view for explaining an example of an equivalent circuit in the state where no finger is in contact or in contiguity with the touch detecting device as illustrated in FIG. 3.
Figure 5:
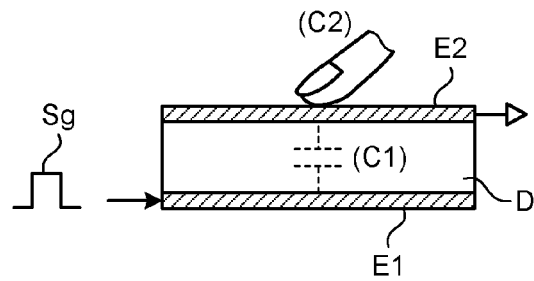
FIG. 5 is a view for explaining the basic principle of detection of a touch operation and illustrates a state where a finger is in contact or in contiguity with the touch detecting device.
Figure 6:
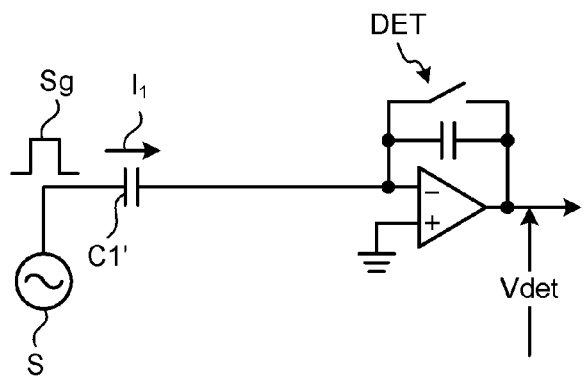
FIG. 6 is a view for explaining an example of the equivalent circuit in the state where a finger is in contact or in contiguity with the touch detecting device as illustrated in FIG. 5.
Figure 7:
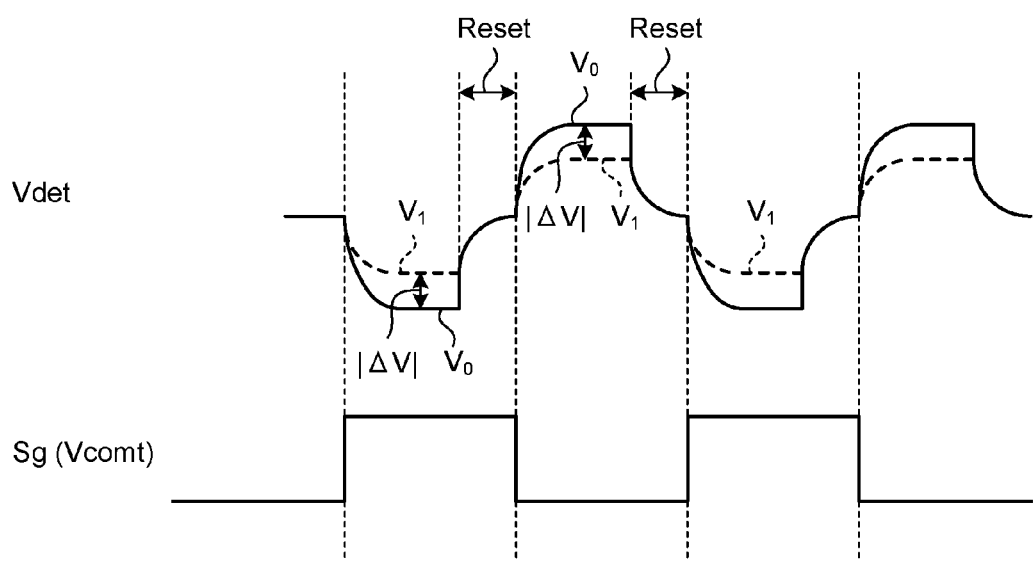
FIG. 7 is a diagram of an example of waveforms of a signal for detecting a touch and a touch detection signal.

FIG. 3 is a view for explaining the basic principle of a capacitive touch detection technology and illustrates a state where no finger is in contact or in contiguity with the touch detecting device. FIG. 4 is a view for explaining an example of an equivalent circuit in the state where a finger is in contact or in contiguity with the touch detecting device as illustrated in FIG. 3. FIG. 5 is a view for explaining the basic principle of detection of a touch operation and illustrates a state where a finger is in contact or in contiguity with the touch detecting device. FIG. 6 is a view for explaining an example of the equivalent circuit in the state where a finger is in contact or in contiguity with the touch detecting device as illustrated in FIG. 5. FIG. 7 is a diagram of an example of waveforms of a signal for detecting a touch and a touch detection signal. A touch detecting unit 30 operates based on the basic principle of capacitive touch detection and outputs the touch detection signal Vdet. The following describes the basic principle of touch detection performed by the display device 1 with a touch detecting function according to the present embodiment with reference to FIG. 1 to FIG. 6.

As illustrated in FIG. 3 and FIG. 5, a capacitive element C1 includes a pair of electrodes of a drive electrode E1 and a touch detection electrode E2 arranged in a manner facing each other with a dielectric D interposed therebetween, for example. As illustrated in FIG. 4 and FIG. 6, one end of the capacitive element C1 is coupled to an alternating-current (AC) signal source (a drive signal source) S, whereas the other end is coupled to a voltage detector (a touch detection processing unit) DET. The voltage detector DET is an integration circuit, for example.

When the AC signal source S applies an alternating-current (AC) rectangular wave Sg at a predetermined frequency (e.g., approximately several kilohertz to several hundred kilohertz) to the drive electrode E1 (the one end of the capacitive element C1), an output waveform (touch detection signal Vdet) is generated via the voltage detector DET coupled to the touch detection electrode E2 (the other end of the capacitive element C1). The AC rectangular wave Sg corresponds to a touch drive signal Vcomt, which will be described later.

When no finger is in contact (or in contiguity) with the device (a non-contact state), an electric current $I_0$ depending on the capacitance value of the capacitive element C1 flows in association with charge and discharge to the capacitive element C1 as illustrated in FIG. 3 and FIG. 4. As illustrated in FIG. 7, the voltage detector DET converts fluctuations in the electric current $I_0$ depending on the AC rectangular wave Sg into fluctuations in the voltage (a waveform $V_0$ indicated by a solid line).

By contrast, when a finger is in contact (or in contiguity) with the device (a contact state), capacitance C2 generated by the finger is in contact or in contiguity with the touch detection electrode E2 as illustrated in FIG. 5. This blocks capacitance of a fringe between the drive electrode E1 and the touch detection electrode E2, thereby providing a capacitive element C having a capacitance value smaller than that of the capacitive element C1. In the equivalent circuit illustrated in FIG. 6, an electric current $I_1$ flows through the capacitive element C1'. As illustrated in FIG. 7, the voltage detector DET converts fluctuations in the electric current $I_1$ depending on the AC rectangular wave Sg into fluctuations in the voltage (a waveform $V_1$ indicated by a dotted line). In this case, the waveform $V_1$ has amplitude smaller than that of the waveform $V_0$. Thus, an absolute value $|\Delta V|$ of the voltage difference between the waveform $V_0$ and the waveform $V_1$ varies depending on an influence of the object, such as a finger, approaching the device from the outside. To detect the absolute value $|\Delta V|$ of the voltage difference between the waveform $V_0$ and the waveform $V_1$ with high accuracy, the voltage detector DET preferably operates with a period RESET to reset charge and discharge of a capacitor based on the frequency of the AC rectangular wave Sg by switching in the circuit. The basic principle in that the touch detecting device 1 detects a touch is not limited to that described above.

The touch detecting unit 30 illustrated in FIG. 18 sequentially scans each detection block or scans a plurality of detection blocks at a time in response to the drive signal Vcom (touch drive signal Vcomt, which will be described later) supplied from a drive electrode driver 14, thereby performing touch detection.

The touch detecting unit 30 outputs the touch detection signal Vdet for each detection block from the touch detection electrodes TDL, which will be described later, via the voltage detector DET illustrated in FIG. 4 or FIG. 6, thereby supplying the touch detection signal Vdet to an analog low-pass filter (LPF) 42 of the touch detection processing unit 40.

An analog/digital (A/D) converter 43 is a circuit that samples an analog signal output from the analog low-pass filter (LPF) 42 at a timing synchronized with the drive signal Vcom, thereby converting the analog signal into a digital signal.

A signal processing unit 44 includes a digital filter that reduces frequency components (noise components) other than the frequency at which the drive signal Vcom is sampled in the output signal from the A/D converter 43. The signal processing unit 44 is a logic circuit that detects whether a touch is made on the touch detecting unit 30 based on the output signal from the A/D converter 43. The signal processing unit 44 performs processing for extracting only the voltage difference caused by the finger. The voltage difference caused by the finger corresponds to the absolute value $|\Delta V|$ of the difference between the waveform $V_0$ and the waveform $V_1$. The signal processing unit 44 may perform an arithmetic operation for averaging the absolute value $|\Delta V|$ per detection block, thereby deriving the average value of the absolute value $|\Delta V|$. Thus, the signal processing unit 44 can reduce an influence caused by noise. The signal processing unit 44 compares the detected voltage difference caused by the finger with a predetermined threshold voltage. If the voltage difference is equal to or larger than the threshold voltage, the signal processing unit 44 determines that an external contiguous object approaching the device from the outside is in contact with the device. If the voltage difference is smaller than the threshold voltage, the signal processing unit 44 determines that the external contiguous object is not in contact with the device. Thus, the touch detection processing unit 40 performs touch detection.

A coordinate extracting unit 45 is a logic circuit that derives, when a touch is detected by the signal processing unit 44, the touch panel coordinates of the touch. A detection timing control unit 46 performs control such that the A/D converter 43, the signal processing unit 44, and the coordinate extracting unit 45 operate in synchronization with one another. The coordinate extracting unit 45 outputs the touch panel coordinates as a signal output Vout.

The following describes a plurality of drive areas L and R included in the touch detecting device 1. While the touch detecting device 1 includes two drive areas L and R in the present embodiment, the number of drive areas is not limited to two. The drive areas L and R each include the drive electrodes COML and the touch detection electrodes TDL. The drive area L includes a plurality of drive electrodes COML represented by reference characters L0 to Lm (m is an integer). The drive area R includes a plurality of drive electrodes COML represented by reference characters R0 to Rn (n is an integer). The drive electrodes COML are hereinafter referred to as blocks L0 to Lm and R0 to Rn as needed. The numbers of the drive areas L and R and the touch detection electrodes TDL are not restricted.

The drive areas L and R are arranged side by side in the Y-direction. The drive area L and the drive area R are divided by a boundary 65. The boundary 65 corresponds to a portion between a block L11 arranged at a part of the drive area L adjacent to the drive area R and a block R11 arranged at a part of the drive area R adjacent to the drive area L. The drive areas L and R are individually driven by the control unit 11. The control unit 11 applies the drive signal Vcom to the drive areas L and R separately and individually via the driving unit 53. The control unit 11 drives the blocks L0 to Lm of the drive electrodes COML arranged in the drive areas L and the blocks R0 to Rn of the drive electrodes COML arranged in the drive areas R individually in the drive areas L and R. The control unit 11, for example, sequentially applies the drive signal Vcom from the block L0 to the block L11 of the drive area L via the driving unit 53 and sequentially applies the drive signal Vcom from the block R0 to the block R11 of the drive area R via the driving unit 53. At this time, the control unit 11 applies the drive signal Vcom simultaneously to the block L0 of the drive area L and the block R0 of the drive area R.

To detect a touch, the touch detecting device 1 sequentially drives the blocks R0 to Rn of the drive area R and the blocks L0 to Lm of the drive area L. If the control unit 11 applies the drive signal Vcom to a block near the boundary 65 between the drive area R and the drive area L (e.g., the blocks Lm and Rm, which are hereinafter referred to as the blocks L11 and R11, respectively, as needed), electric fields of the blocks (the blocks L11 and R11 in this example) near the boundary 65 between the drive area R and the drive area L may possibly cross the boundary 65 between the drive area R and the drive area L as indicated by the arrows in FIG. 1. As a result, it may possibly be difficult for the touch detection processing unit 40 and the control unit 11 to identify to which block of the drive electrodes COML the touch detection signal Vdet corresponds.

When the control unit 11 drives the block R11 of the drive area R and the block L11 of the drive area L illustrated in FIG. 1, for example, the electric field generated by the block R11 affects the block R10 of the drive area R and the block L11 of the drive area L adjacent to the drive area R as indicated by the arrows in FIG. 1. When the touch detection processing unit 40 and the control unit 11 detect a touch at the block L11, the influence of the electric field generated by the block R11 adjacent to the block L11 may possibly cause the touch detection electrodes TDL of the drive area L to output a signal even though no touch is made at the block L11. The touch detection processing unit 40 and the control unit 11 receive the signal and may possibly determine that a touch is made at the block L11 even though no touch is made at the block L11. As described above, the touch detecting device 1 drives two drive areas L and R individually and detects a touch simultaneously in the two drive areas L and R. When a touch is detected at the blocks L11 and R11 arranged near the boundary 65, for example, it is difficult to identify whether the detected touch means a change in the capacitance of the drive area L or the drive area R. This may possibly result in false detection of the touch. The same situation occurs in the case where the drive signal Vcom is applied to the block L11 of the drive area L illustrated in FIG. 1.

The touch detecting device 1 includes an interference portion 66 formed of drive electrodes COML that are arranged near the boundary 65 between the drive area (a first drive area) L and the drive area (a second drive area) R and affected by electric fields of other drive electrodes COML. Drive electrodes COML not included in the interference portion 66 are referred to as independent portions 67L and 67R. The interference portion 66 is a predetermined area extending in the Y-direction, which is the second direction, from the boundary 65 between the drive areas L and R adjacent to each other. In other words, the interference portion 66 is arranged both in the drive areas L and R. The interference portion 66 in the drive area L corresponds to a first predetermined area, whereas the interference portion 66 in the drive area R corresponds to a second predetermined area. The interference portion 66 in the drive area L and the interference portion 66 in the drive area R face each other with the boundary 65 interposed therebetween.

In the touch detecting device 1 of the example illustrated in FIG. 1, the interference portion 66 is formed of six drive electrodes COML arranged in a predetermined range in the drive area R and a predetermined range in the drive area L with respect to the boundary 65 between the drive areas L and R. Specifically, in the touch detecting device 1, out of the drive electrodes COML of the drive area R, three blocks of the block R9 to the block R11 positioned near the boundary 65 are the interference portion 66, and the block R0 to the block R8 are the independent portion 67R. Similarly, in the touch detecting device 1, out of the drive electrodes COML of the drive area L, three blocks of the block L9 to the block L11 positioned near the boundary 65 are the interference portion 66, and the block L0 to the block L8 are the independent portion 67L.

In the touch detecting device 1 in this example, six drive electrodes COML with respect to the boundary 65 between the drive areas L and R, that is, three drive electrodes COML in each of the drive areas L and R are defined as the interference portion 66. The range of the interference portion 66 in the Y-direction is determined depending on the range affected by the electric fields of the drive electrodes COML near the boundary 65. When the drive signal Vcom is applied to a drive electrode COML near the boundary 65, for example, an electric field is generated by the drive electrode COML to which the drive signal Vcom is applied. The range in which the electric field crosses the boundary 65 and affects the adjacent drive area may be the range of the interference portion 66 in the Y-direction. The range in which the electric field generated by the drive electrode COML affects the adjacent drive area may be a range in which a signal caused by the electric field generated by the drive electrode COML and mixed with a touch detection signal Vdet output from a touch detection electrode TDL arranged in the adjacent drive area prevents the touch detection processing unit 40 and the control unit 11 from detecting the touch detection signal Vdet corresponding to a touch, for example. The range in which the electric field generated by the drive electrode COML affects the adjacent drive area may be a range of two drive electrodes COML in a direction away from the boundary 65 in the Y-direction in each of the drive areas L and R with respect to the boundary 65, for example.

Figure 8A:
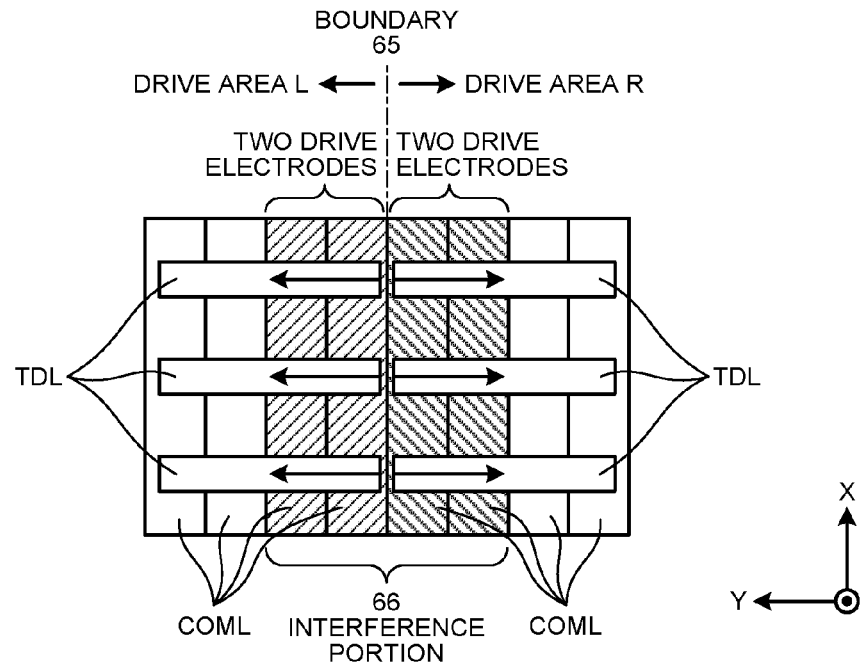
FIG. 8A is a schematic of an example of an interference portion of the touch detecting device according to the first embodiment.
Figure 8B:
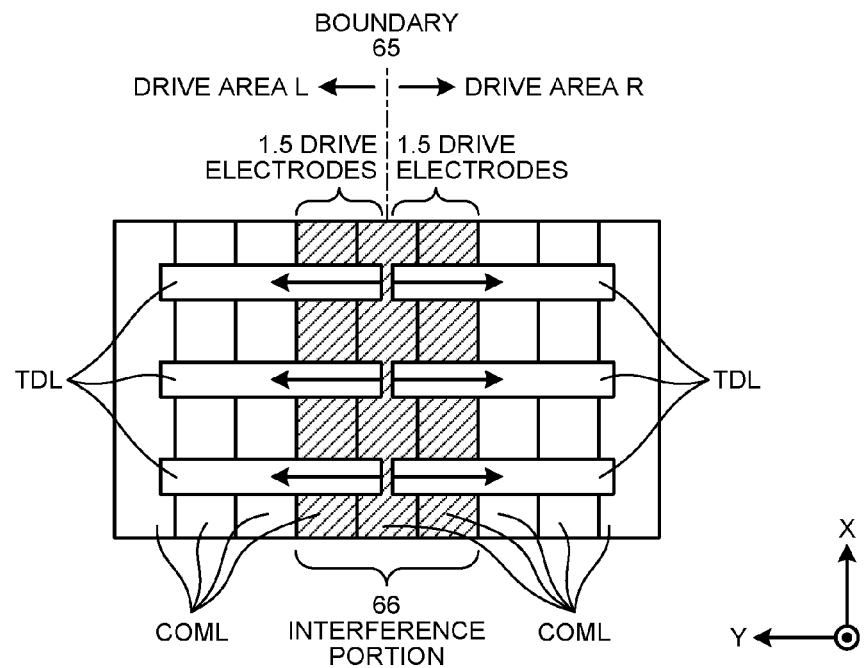
FIG. 8B is a schematic of another example of the interference portion of the touch detecting device according to the first embodiment.

FIG. 8A is a schematic of an example of the interference portion of the touch detecting device according to the first embodiment. FIG. 8B is a schematic of another example of the interference portion of the touch detecting device according to the first embodiment. The interference portion 66 simply needs to have a dimension of equal to or larger than one-half of that of the drive electrodes COML in the Y-direction, which is the second direction, in one drive area. As illustrated in FIG. 8A, for example, two drive electrodes COML arranged in a direction away from the boundary 65 in the Y-direction in each of the drive areas L and R with respect to the boundary 65 may be defined as the interference portion 66. Alternatively, as illustrated in FIG. 8B, 1.5 drive electrodes COML arranged in the direction away from the boundary 65 in the Y-direction in each of the drive areas L and R with respect to the boundary 65 may be defined as the interference portion 66, for example. When collectively driving a plurality of drive electrodes COML, the interference portion 66 simply needs to have a dimension of equal to or larger than one-half of the dimension in the Y-direction of the drive electrodes COML that are simultaneously driven.

The drive areas L and R preferably have the same size (same area). The boundary 65 between the drive areas L and R is preferably parallel to the blocks L0 to Lm and the blocks R0 to Rn or orthogonal to the touch detection electrodes TDL. By making the drive areas L and R the same in size and making the boundary 65 parallel to the blocks L0 to Lm and the blocks R0 to Rn or orthogonal to the touch detection electrodes TDL, the circuit of the touch detecting device 1 can be designed to have a symmetrical configuration with respect to the boundary 65. This enables rational designing of the touch detecting device 1.

In the drive areas L and R adjacent to each other, the touch detection electrodes TDL belonging to each of the drive areas L and R are preferably arranged at the same position in the Y-direction, which is the second direction, on the boundary 65 side. Thereby, when the interference portion 66 corresponds to a range of a certain distance from the touch detection electrodes TDL, it is possible to make the interference portion 66 the smallest and make the independent portions 67L and 67R the largest. It is possible to increase the report rate most efficiently. The following describes an operation of the touch detecting device 1.

Figure 10:
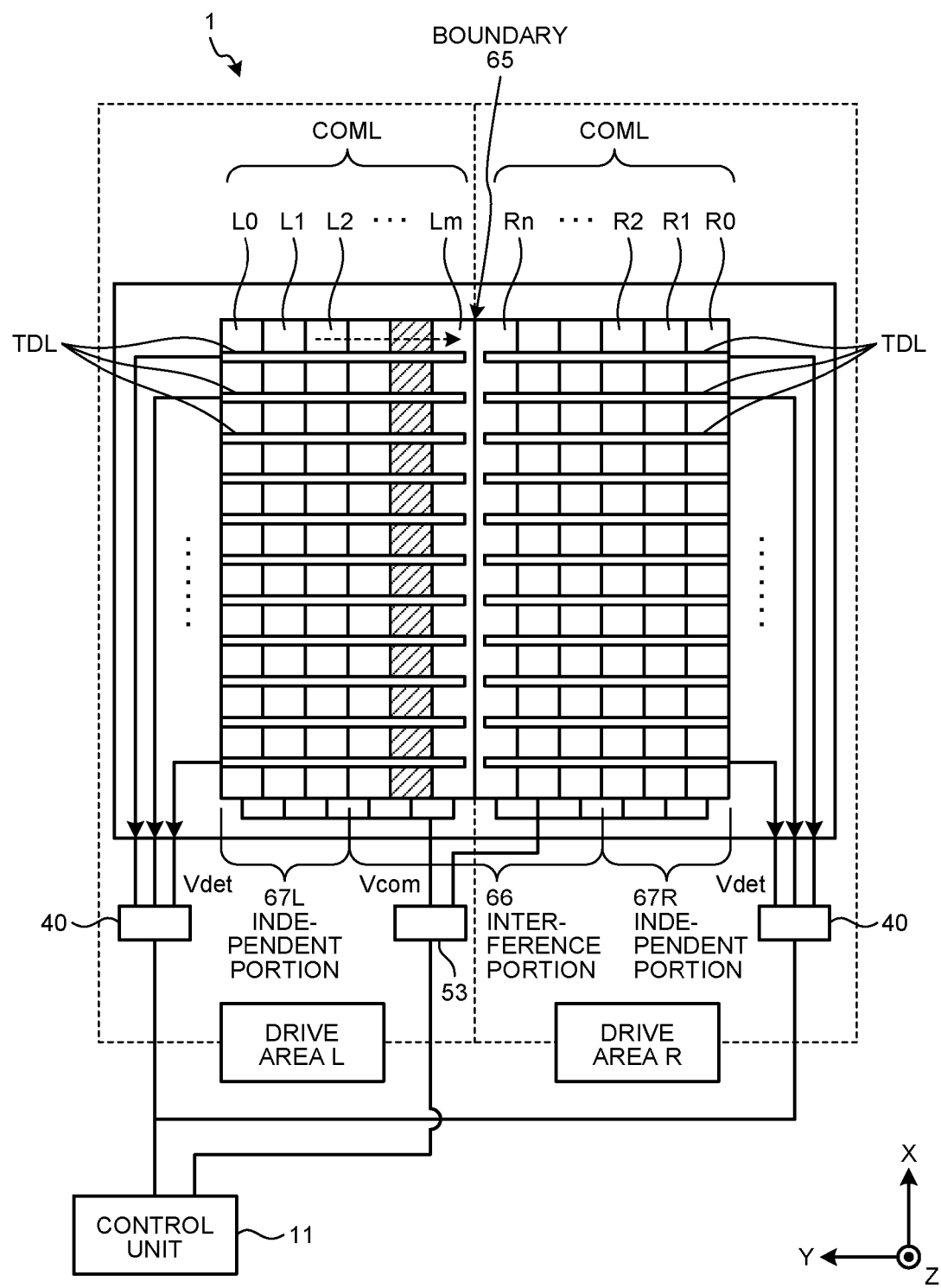
FIG. 10 is a schematic of a state where the interference portion of one drive area is driven out of drive areas of the touch detecting device according to the first embodiment.
Figure 11:
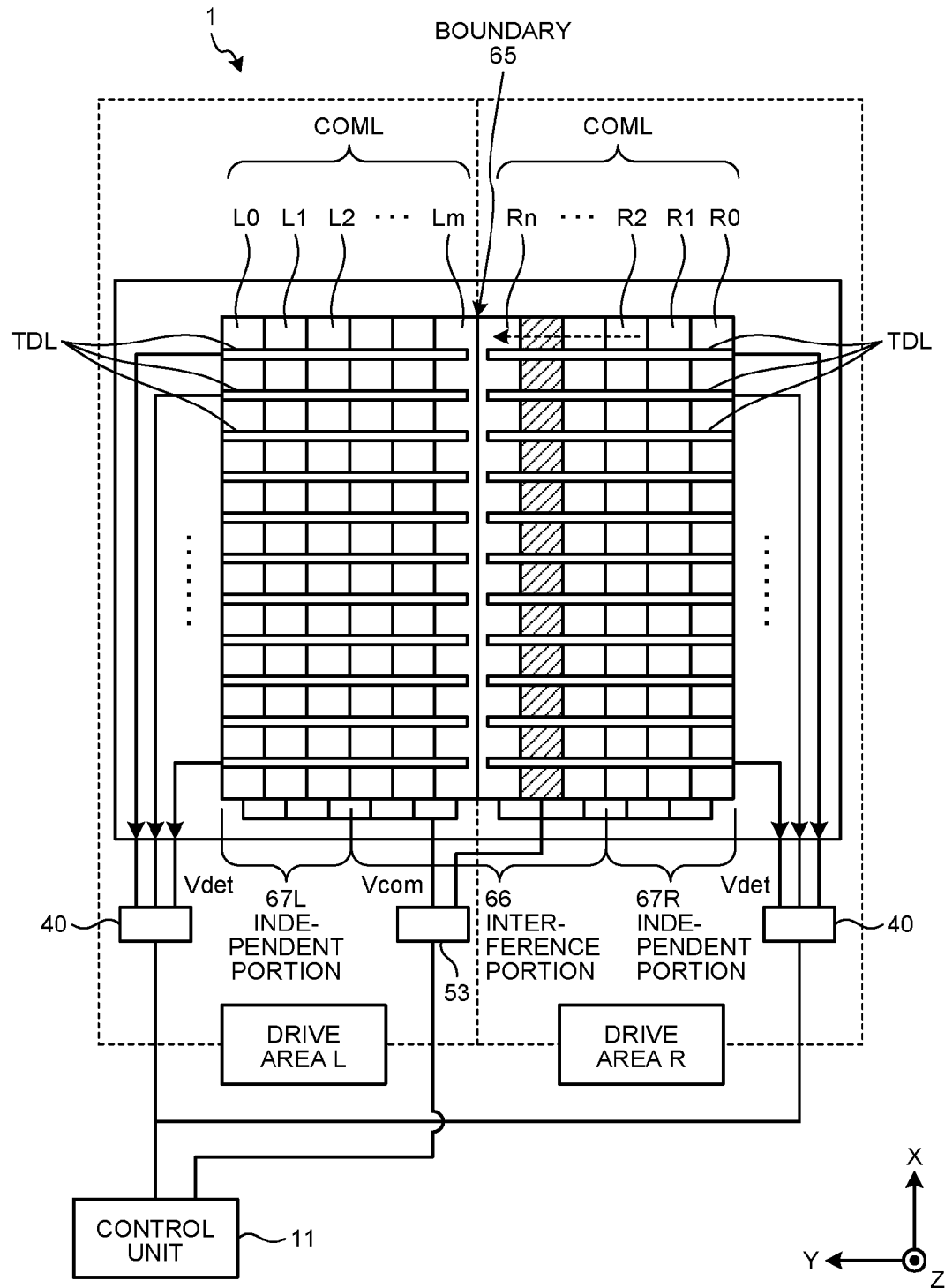
FIG. 11 is a schematic of a state where the interference portion of the other drive area is driven out of the drive areas of the touch detecting device according to the first embodiment.

FIG. 9 is a diagram illustrating a driving order of the blocks of the drive electrodes. FIG. 10 is a schematic of a state where the interference portion of one drive area is driven out of the drive areas of the touch detecting device according to the first embodiment. FIG. 11 is a schematic of a state where the interference portion of the other drive area is driven out of the drive areas of the touch detecting device according to the first embodiment. In the present embodiment, the control unit 11 applies the drive signal Vcom to the drive electrodes COML arranged in the interference portion 66 in the Y-direction from the boundary 65 between the drive areas L and R adjacent to each other. At this timing, the control unit 11 stops application of the drive signal Vcom to drive electrodes COML that are arranged in the drive area adjacent to the interference portion 66 out of the drive areas L and R and are not included in the drive electrodes COML to which the drive signal Vcom is applied. The following describes the operation more specifically.

In the touch detecting device 1 illustrated in FIG. 1, the blocks R0 to R8 of the drive area R serve as the independent portion 67R, and the blocks R9 to R11 serve as the interference portion 66. The blocks L0 to L8 of the drive area L serve as the independent portion 67L, and the blocks L9 to L11 serve as the interference portion 66. To detect a touch, the control unit 11 drives, that is, applies the drive signal Vcom to the blocks R0 to R8 arranged in the independent portion 67R of the drive area R and the blocks L0 to L8 arranged in the independent portion 67L of the drive area L in the order illustrated in FIG. 9.

When it is time to drive the blocks (the blocks L9 to L11 in the present embodiment) of the interference portion 66 in the drive area L, for example, the control unit 11 stops driving, that is, stops application of the drive signal Vcom to all the blocks (the blocks R0 to Rn in the present embodiment) arranged in the drive area R adjacent to the interference portion 66 in the drive area L. The touch detecting device 1 stops driving the drive area R, that is, stops application of the drive signal Vcom to all the drive electrodes COML included in the drive area R. Subsequently, the touch detecting device 1 drives the blocks L9, L10, and L11 of the interference portion 66 in the drive area L in this order as illustrated in FIG. 10.

This operation drives the blocks L9 to L11 of the interference portion 66 in the drive area L alone while stopping the driving of the drive area R at the timing to drive the blocks L9 to L11 of the interference portion 66 in the drive area L. When the driving of the blocks L9 to L11 serving as the interference portion 66 in the drive area L is completed, the control unit 11 and the driving unit 53 drive the blocks R9 to R11 arranged in the interference portion 66 in the drive area R of which driving has been stopped as illustrated in FIG. 11. After the blocks L0 to Lm of the independent portion 67L and the interference portion 66 in the drive area L and the blocks R0 to Rn of the independent portion 67R and the interference portion 66 in the drive area R are driven, the control unit 11 sequentially drives the blocks from the block L0 of the independent portion 67L in the drive area L and the block R0 of the independent portion 67R in the drive area R.

In this example, the control unit 11 drives the blocks L0 to L8 of the independent portion 67L in the drive area L and the blocks R0 to R8 of the independent portion 67R in the drive area R in parallel. Subsequently, the control unit 11 drives the blocks L9 to L11 of the interference portion 66 in the drive area L and then drives the blocks R9 to R11. The driving order is not limited thereto. The control unit 11 may drive the blocks R9 to R11 of the interference portion 66 in the drive area R and then drive the blocks L9 to L11 of the interference portion 66 in the drive area L.

As described above, to drive the independent portions 67L and 67R, the control unit 11 drives the blocks L0 to Lm in the drive area L and the blocks R0 to Rn in the drive area R separately. At a timing to drive blocks arranged in the interference portion 66 in one of drive areas, the control unit 11 stops driving the blocks arranged in the other of drive areas. After the driving of the blocks arranged in the interference portion 66 in the one drive area, the touch detecting device 1 drives blocks arranged in the interference portion 66 in the other drive area. Even when the blocks of the interference portion 66 adjacent to the boundary 65 between the drive areas L and R in one drive area are driven and the electric fields of the driven blocks cross the boundary 65, the touch detecting device 1 can make the electric fields less likely to affect a touch detection operation on the other drive area because the driving of the other drive area is stopped. Thus, the touch detecting device 1 can accurately identify the position of the driven block and at which the value of the capacitance changes, thereby detecting the position of the touch. Because the touch detecting device 1 drives the blocks of the independent portions 67L and 67R in the drive areas L and R in parallel, the touch detecting device 1 can complete driving of all the blocks at high speed even when the blocks are sequentially driven in a time division manner. This can increase the report rate in touch detection.

In the present embodiment, when outputs OUT_L and OUT_R are supplied from the touch detection electrodes TDL of the drive areas L and R for the blocks L0 to L8 and R0 to R8 corresponding to the independent portions 67L and 67R of the drive areas L and R, respectively, as illustrated in FIG. 9, the control unit 11 uses these outputs OUT_L and OUT_R as the touch detection signal Vdet in the drive areas L and R, respectively. When driving the blocks L9 to L11 arranged in the interference portion 66 in the drive area L, the control unit 11 uses a value obtained by combining the output OUT_L from the touch detection electrodes TDL of the drive area L and the output OUT_R from the touch detection electrodes TDL of the drive area R as the touch detection signal Vdet. Similarly, when driving the blocks R9 to R11 arranged in the interference portion 66 in the drive area R, the control unit 11 uses a value obtained by combining the output from the touch detection electrodes TDL of the drive area R and the output from the touch detection electrodes TDL of the drive area L as the touch detection signal Vdet. This can cancel out the influence of the electric field generated by the drive electrode COML to which the drive signal Vcom is applied, thereby improving the detection accuracy of a touch.

When the drive electrodes COML of the interference portion 66 are driven, the touch detecting device 1 adds the output from the touch detection electrodes TDL in the adjacent area, thereby detecting the electric field generated by the drive electrodes COML of the interference portion and affecting the touch detection electrodes TDL in the adjacent drive area. This can increase the accuracy and the sensitivity in detection. When a drive electrode COML in the independent area is driven, it is not necessary to add the output from the touch detection electrodes TDL because the influence of the electric field on the touch detection electrodes COML in the adjacent area is negligibly small.

By combining the output from the touch detection electrodes TDL in the drive area L and the output from the touch detection electrodes TDL in the drive area R when the drive electrodes COML of the interference portion are driven, the advantages described above are provided. The outputs are not necessarily combined in the present embodiment. When the drive electrodes COML of the interference area in the drive area L are driven, the output from the touch detection electrodes TDL in the drive area L alone may be detected. When the drive electrodes COML of the interference area in the drive area R are driven, the output from the touch detection electrodes TDL in the drive area R alone may be detected.

By incorporating the touch detecting device 1 into a liquid-crystal display device, an in-cell display device with a touch detecting function is provided. The in-cell display device with a touch detecting function needs to have a display period and a touch detection period separately in a predetermined period, such as one horizontal period or one vertical period, to perform operations. As a result, the in-cell display device with a touch detecting function may possibly have a lower report rate in touch detection. By contrast, the touch detecting device 1 according to the present embodiment can complete driving of all the blocks at high speed by driving the blocks in the drive areas L and R in parallel. Thus, an in-cell display device with a touch detecting function to which the touch detecting device 1 is applied can increase the report rate in touch detection.

1-2. Second Embodiment

A touch detecting device 1 according to a second embodiment will be described. The touch detecting device 1 according to the first embodiment drives only one block simultaneously in the drive area L or the drive area R both in the driving of the blocks of the independent portions 67L and 67R in the drive areas L and R, respectively, and the driving of the blocks of the interference portion 66. In a touch detecting device 1A according to the second embodiment, a control unit 11 simultaneously applies drive signals Vcom to at least two of a plurality of drive electrodes COML in at least one drive area out of drive areas L and R, thereby simultaneously driving a plurality of blocks. The touch detecting device 1A according to the second embodiment is different from the touch detecting device 1 according to the first embodiment only in this respect. The following describes only the difference, and an overlapping explanation is omitted.

Figure 12:
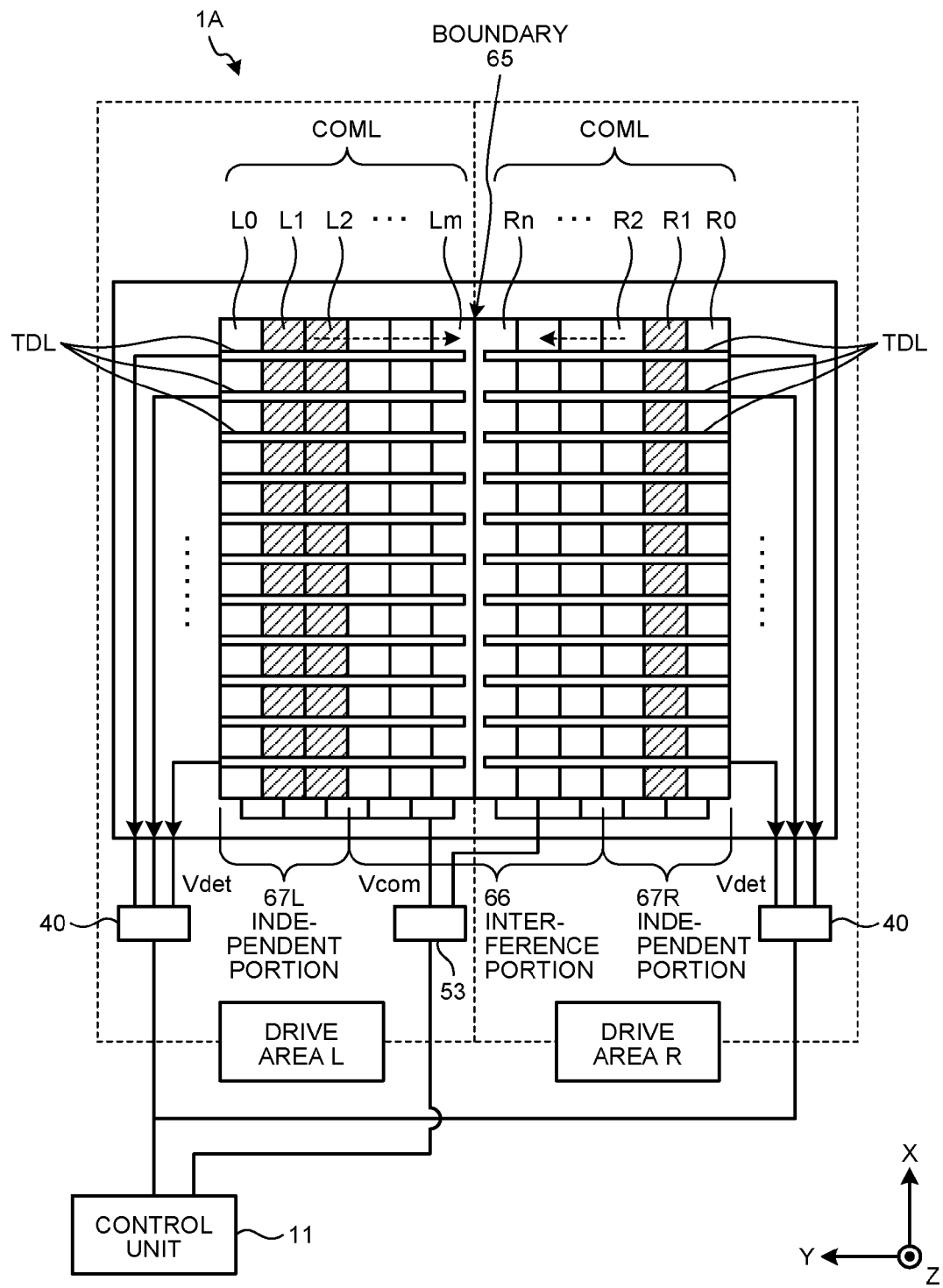
FIG. 12 is a schematic of a state where a plurality of blocks are simultaneously driven in a touch detecting device according to a second embodiment.
Figure 13:
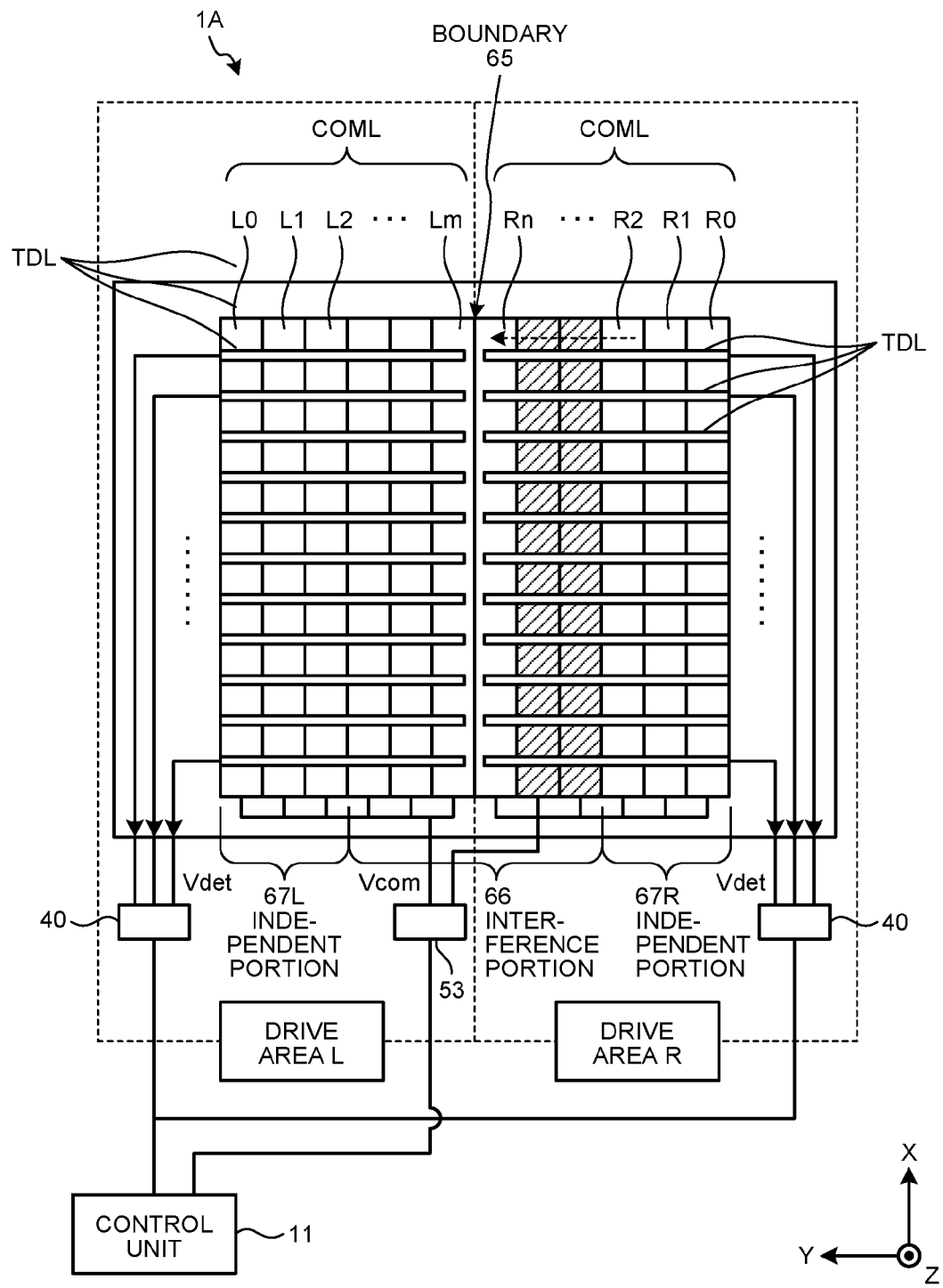
FIG. 13 is a schematic of a state where a plurality of blocks are simultaneously driven in the touch detecting device according to the second embodiment.

FIGS. 12 and 13 are schematics of a state where a plurality of blocks are simultaneously driven in the touch detecting device 1A according to the second embodiment. In FIGS. 12 and 13, blocks being driven are indicated by the hatched lines. To drive blocks of independent portion 67R in the drive area R, the touch detecting device 1A (specifically, the control unit 11) applies a drive signal Vcom to each drive electrode COML, thereby sequentially driving one block at a time in the drive area R in order of a block R0, a block R1, a block R2, . . . , for example, as illustrated in FIG. 12. To drive the blocks of the independent portion 67L in the drive area L, the touch detecting device 1A applies the drive signal Vcom to two drive electrodes COML at a time, thereby sequentially driving two blocks at a time in the drive area L in order of a block L0 and a block L1, a block L2 and a block L3, a block L4 and a block L5, . . . , for example.

Thus, the touch detecting device 1A can increase the number of blocks being driven in the drive area L, thereby further increasing the report rate and the sensitivity in touch detection. While the control unit 11 drives two blocks at a time in the drive area L in the present embodiment, the control unit 11 may drive two blocks at a time in the drive area R. Alternatively, the control unit 11 may drive three or four blocks at a time in the drive area L, for example. Still alternatively, the control unit 11 may drive a plurality of blocks at a time in each of the drive area L and the drive area R. In these cases as well, the touch detecting device 1A can further increase the report rate and the sensitivity in touch detection.

The touch detecting device 1A drives one or a plurality of blocks at a time in the drive areas L and R. At a timing to drive blocks arranged in an interference portion 66 in one of the drive areas L and R, the touch detecting device 1A stops driving the blocks arranged in the other of the drive areas L and R. FIG. 13 is a schematic of an example in which two blocks are driven at a time in the drive area R. As illustrated in FIG. 13, when starting to drive the interference portion 66 in the drive area R, the touch detecting device 1A stops driving the blocks in the drive area L. Similarly, when starting to drive the interference portion 66 in the drive area L, the touch detecting device 1A stops driving the blocks in the drive area R. With this control, the touch detecting device 1A can reduce an influence of an electric field crossing a boundary 65 between the drive areas L and R on touch detection when driving the blocks of the interference portion 66. As a result, the touch detecting device 1A can accurately identify the position of a driven block and at which the value of the capacitance changes, thereby detecting the position of a touch. Thus, the touch detecting device 1A can provide advantages similar to those in the first embodiment.

1-3. Third Embodiment

Figure 14:
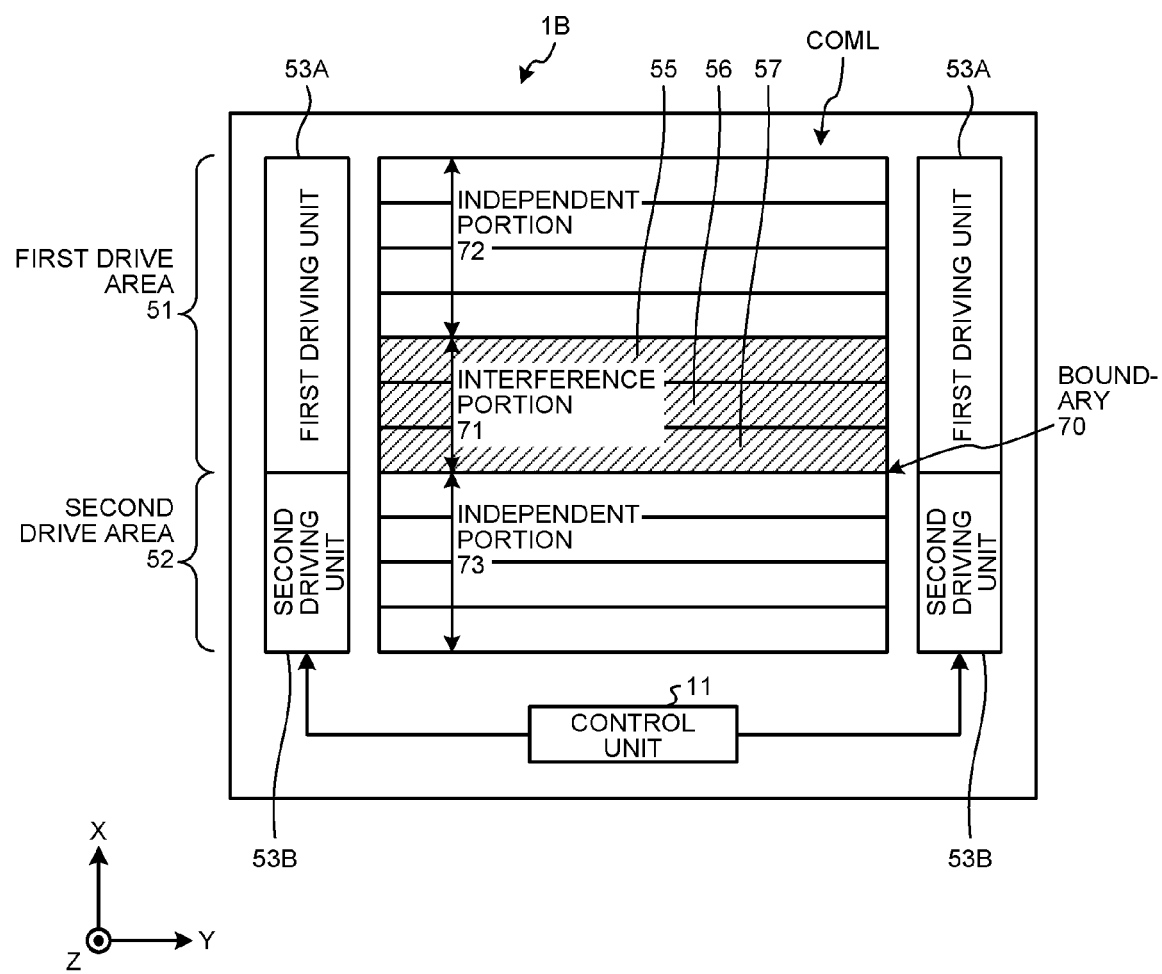
FIG. 14 is a schematic of a touch detecting device according to a third embodiment.

FIG. 14 is a schematic of a touch detecting device according to a third embodiment. The touch detecting device 1 according to the first embodiment and the touch detecting device 1A according to the second embodiment require a plurality of types of signals to drive the drive electrodes COML. The types of signals include a first start signal to start driving of the blocks of the independent portions 67L and 67R and a second start signal to start and control driving of the blocks of the interference portion 66, for example. By contrast, the touch detecting device according to the third embodiment can drive blocks of an independent portion and an interference portion in each drive area with one type of start signal and one type of clock. The touch detecting device according to the third embodiment is suitably used to provide a transfer circuit, such as a scanner and a shift register, on the surface of a substrate. The third embodiment is different from the first embodiment and the second embodiment only in this respect. The following describes only the difference, and an overlapping explanation is omitted.

As illustrated in FIG. 14, a touch detecting device 1B includes a first drive area 51 and a second drive area 52 corresponding to the drive areas L and R. The second drive area 52 is adjacent to the first drive area 51 in the X-direction. The first drive area 51 and the second drive area 52 correspond to the drive areas. The first drive area 51 is provided with a pair of first driving units 53A serving as a driving unit to drive blocks individually. The second drive area 52 is provided with a pair of second driving units 53B serving as a driving unit to drive blocks individually. The first driving units 53A and the second driving units 53B are controlled by a control unit 11. The second driving units 53B, for example, include a shift register controlled by a start signal and a transfer clock supplied from the control unit 11.

In the touch detecting device 1B, an area corresponding to a predetermined number of (three in the present embodiment) drive electrodes COML toward the first drive area 51 side from a boundary 70 between the first drive area 51 and the second drive area 52 is defined as a predetermined area, that is, an interference portion 71. In the touch detecting device 1B, the number of drive electrodes COML belonging to the first drive area 51 is larger than that of the drive electrodes COML belonging to the second drive area 52. The drive electrodes COML belonging to the interference portion 71 in the first drive area 51 corresponds to blocks 55 to 57. In the first drive area 51, the parts other than the interference portion 71 serve as an independent portion 72. The whole of the second drive area 51 serves as an independent portion 73. The number of drive electrodes COML included in the independent portion 73 of the second drive area 52, that is, the number of blocks included in the second drive area 52 is the same as the number of drive electrodes COML, that is, the number of blocks included in the independent portion 72 of the first drive area 51.

The control unit 11 sequentially applies a drive signal Vcom from the drive electrode COML arranged farthest from the boundary 70 in the X-direction out of the drive electrodes COML belonging to the first drive area 51 to a drive electrode COML arranged near the boundary 70. In addition, the control unit 11 sequentially applies a drive signal Vcom from the drive electrode COML arranged nearest the boundary 70 in the X-direction out of the drive electrodes COML belonging to the second drive area 52 to a drive electrode COML arranged away from the boundary 70. The control unit 11 repeats the processing described above. When the touch detecting device 1B completes driving of the blocks (drive electrodes COML) arranged in the independent portion 72 the first drive area 51 and the independent portion 73 of the second drive area 52 and starts to drive the blocks 55 to 57 (drive electrodes COML) arranged in the interference portion 71 of the first drive area 51, the shift register included in the second driving units 53B completes the transfer. Thus, the second drive area 52 has no block (drive electrode COML) to be driven.

After the shift register included in the second driving units 53B completes the transfer, no drive electrode COML is selected, whereby no drive signal Vcom (pulse) is applied to any drive electrode COML. As a result, the shift register included in the second driving units 53 does not operate.

In the touch detecting device 1B, only the first drive area 51 includes the interference portion 71, and the independent portion 72 in the first drive area 51 and the independent portion 73 in the second drive area 52 have the same number of blocks. The touch detecting device 1B simultaneously drives the blocks included in the first drive area 51 and the second drive area 52. To drive the blocks arranged in the interference portion 71 of the first drive area 51, the touch detecting device 1B performs idle driving of the second drive area 52 and waits until driving of the blocks arranged in the interference portion 71 of the first drive area 51 is completed. After the driving of the blocks in the interference portion 71 is completed, the touch detecting device 1B starts the driving again from the first block in the independent portion 72 of the first drive area 51 and the independent portion 73 of the second drive area 52.

With this driving method, the touch detecting device 1B requires no signal to stop driving the blocks in the second drive area 52 when driving the interference portion 71 in the first drive area 51. In other words, the touch detecting device 1B can drive the blocks arranged in the independent portions 72 and 73 of the first drive area 51 and the second drive area 52, respectively, and the blocks in the interference portion 71 of the first drive area 51 with one type of start signal to start driving the blocks in the first drive area 51 and the second drive area 52 and one type of clock to control driving of the blocks. Thus, the touch detecting device 1B can reduce the number of types of signals required to drive the blocks compared with the touch detecting devices 1 and 1A according to the first and the second embodiments, respectively. In addition, the touch detecting device 1B can provide advantages similar to those of the touch detecting devices 1 and 1A according to the first and the second embodiments, respectively. The touch detecting device 1B is especially used for an in-cell display device with a touch detecting function in which an extending direction (Y-direction) of gate lines for display is parallel to an extending direction (Y-direction) of the drive electrodes COML.

1-4. Fourth Embodiment

Figure 15:
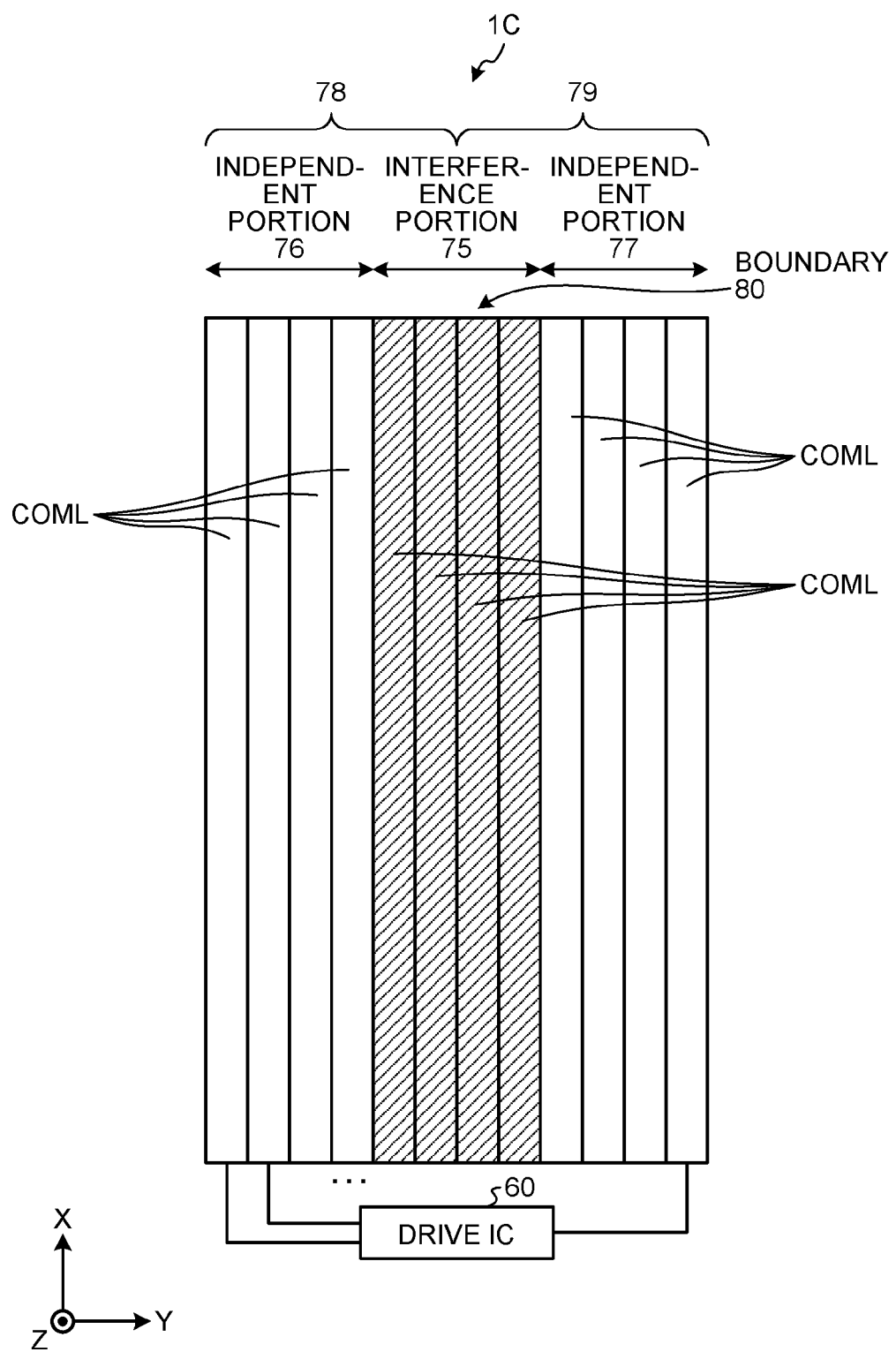
FIG. 15 is a schematic of a touch detecting device according to a fourth embodiment.

FIG. 15 is a schematic of a touch detecting device according to a fourth embodiment. A touch detecting device 1C has a dimension of a drive electrode COML in the X-direction serving as the first direction, that is, a dimension in which the drive electrode COML extends larger than the entire dimension of a plurality of drive areas (a first drive area 78 and a second drive area 79) in the Y-direction serving as the second direction. If the touch detecting device 1C is incorporated with a liquid-crystal display device to be used as a display device with a touch detecting function, the drive electrodes COML extend in the longitudinal direction of a rectangular screen in a planar view.

The touch detecting device 1C includes the first drive area 78 and the second drive area 79 as drive areas. In the touch detecting device 1C, a range corresponding to a predetermined number of (two in the present embodiment) blocks of the drive electrodes COML on the first drive area 78 side from a boundary 80 between the first drive area 78 and the second drive area 79 is defined as an interference portion 75. In the touch detecting device 1C, a range corresponding to a predetermined number of (two in the present embodiment) blocks of the drive electrodes COML on the second drive area 79 side from the boundary 80 is also defined as the interference portion 75. Blocks of the drive electrodes COML not included in the interference portion 75 in the first drive area 78 and the second drive area 79 serve as an independent portion 76.

The touch detecting device 1C includes a drive integrated circuit (IC) 60 serving as an integrated circuit. The drive IC 60 includes at least a driving unit and a multiplexer that supply a drive signal to each block. If the touch detecting device 1C is used for a display device with a touch detecting function, the drive electrodes COML extend in the longitudinal direction (X-direction in FIG. 15) of the rectangular screen in a planar view, and touch detection electrodes TDL extend in a direction (Y-direction) orthogonal to the extending direction of the drive electrodes COML. With this configuration, the drive IC 60 can be arranged on an end side in the longitudinal direction of the drive electrodes COML. This arrangement enables the drive IC 60 to have logic, such as the driving unit and the multiplexer.

To make the extending direction of the drive electrodes COML parallel to the short direction of the screen, it is necessary to arrange the driving unit on both end sides of the drive electrodes COML and on the sides of the long side of the screen like the touch detecting device 1B illustrated in FIG. 14, for example.

The touch detecting device 1C enables the drive IC 60 to have the logic, such as the driving unit and the multiplexer. Thus, the driving unit need not be arranged on the sides of the long side of the screen, thereby downsizing the touch detecting device 1C. The touch detecting device 1C is preferably used for a display device in which an extending direction (X-direction) of signal lines for display is parallel to an extending direction (X-direction) of the drive electrodes COML. The touch detecting device 1C need not route the wiring to embed the drive IC 60 in a COG (a chip on glass), thereby reducing the frame size and resistance.

1-5. Fifth Embodiment

Figure 16:
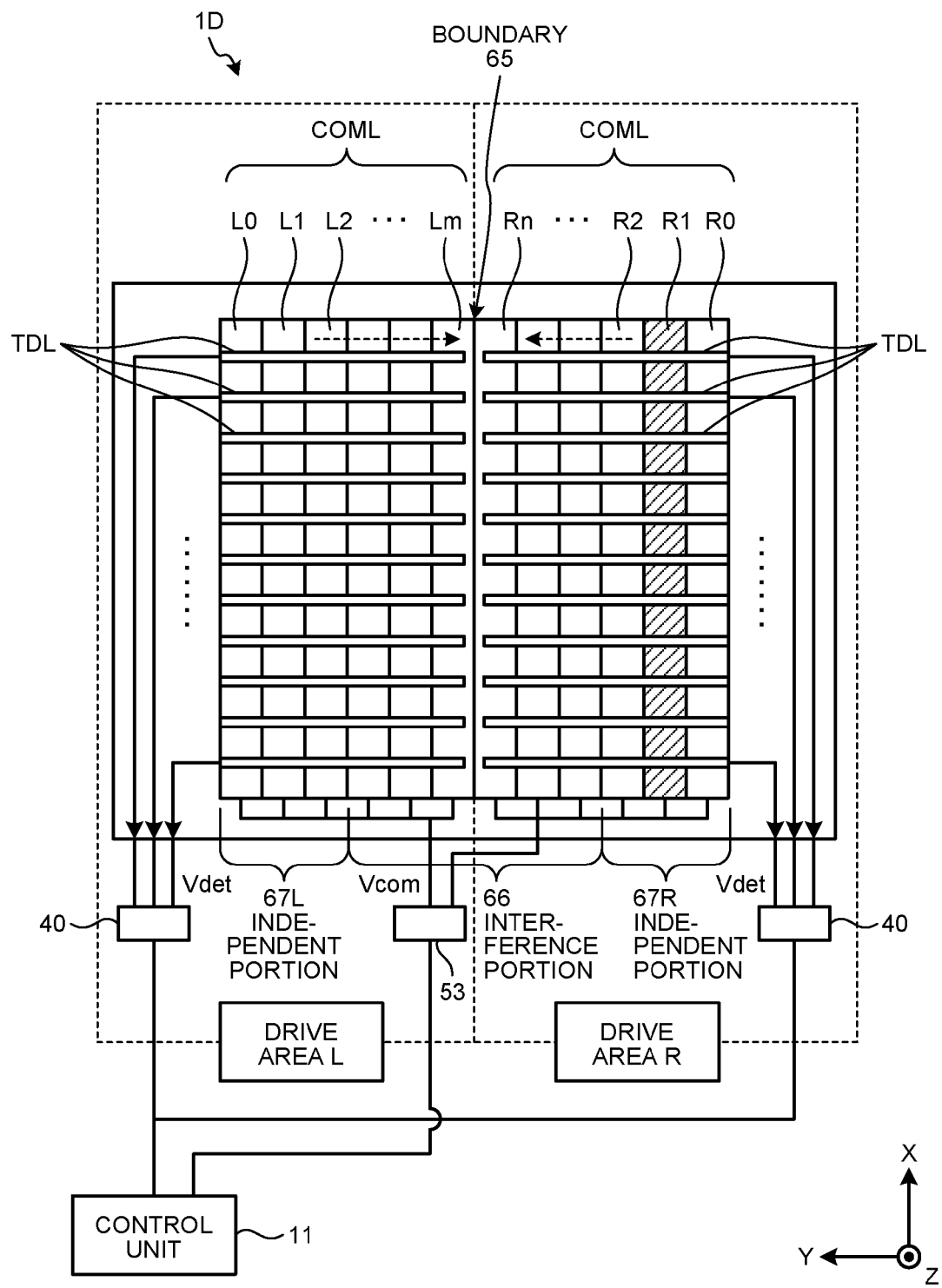
FIG. 16 is a schematic of a touch detecting device according to a fifth embodiment.
Figure 17:
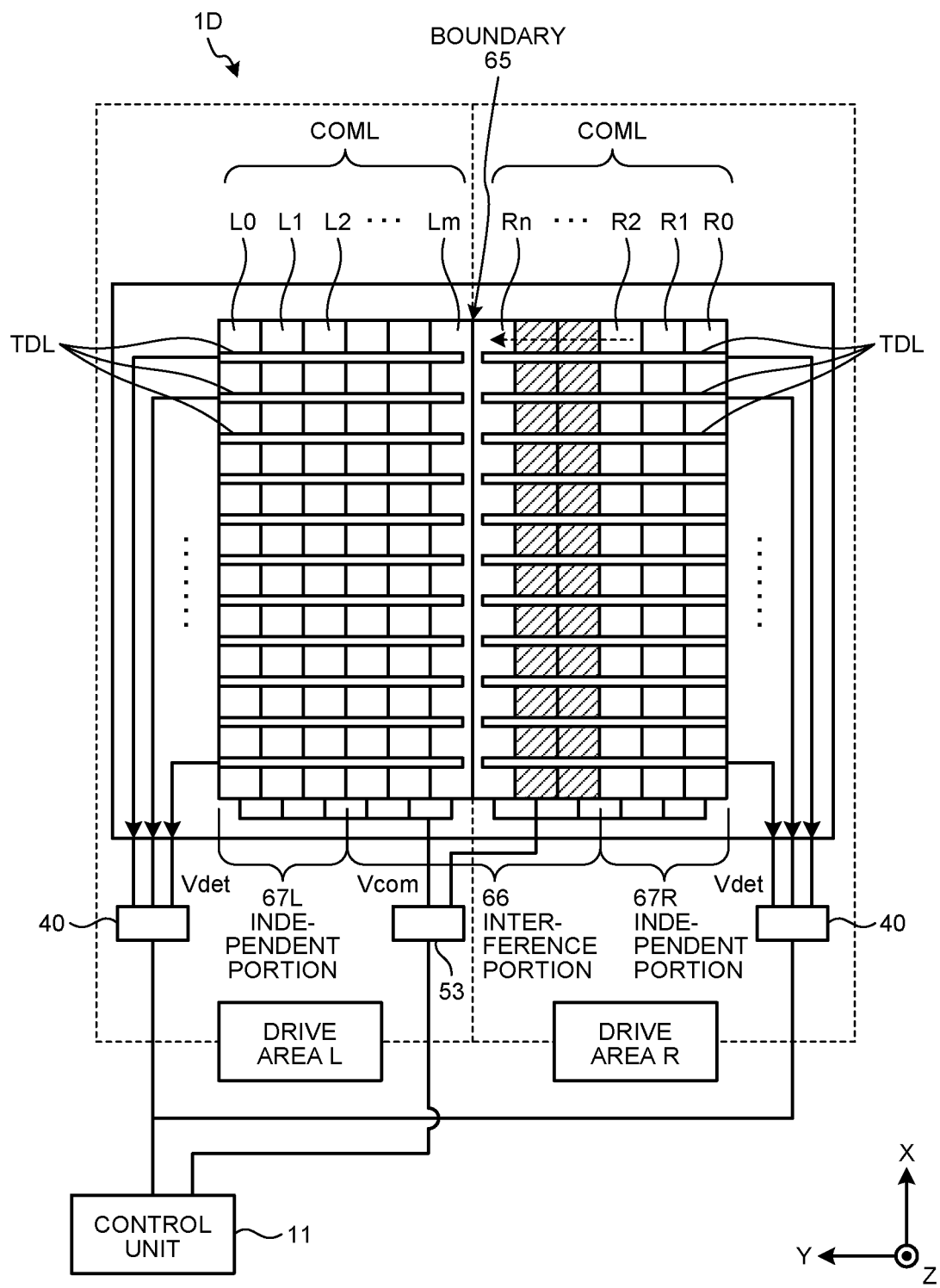
FIG. 17 is a schematic of the touch detecting device according to the fifth embodiment.

FIG. 16 and FIG. 17 are schematics of a touch detecting device according to a fifth embodiment. The touch detecting devices 1 and 1A detect a touch using the same mutual capacitance type detection method for the drive area R and the drive area L. The touch detecting device 1D according to the fifth embodiment detects a touch using different detection methods for a drive area R and a drive area L.

A touch detecting device 1D detects a touch by using a mutual capacitance type method for the drive area R and a self-capacitance type method for the drive area L. To detect a touch, a control unit 11 drives drive electrodes COML and touch detection electrodes TDL belonging to at least one of the drive areas (the drive area R in the present embodiment) out of the drive areas L and R by using the mutual capacitance type method. The control unit 11 drives, by using the self-capacitance type method, any one or both of the drive electrodes COML and the touch detection electrodes TDL belonging to a drive area (the drive area L in the present embodiment) adjacent to the drive area (the drive area R in the present embodiment) driven by the mutual capacitance type method. To drive the touch detection electrodes TDL using the self-capacitance type method, the control unit 11 may supply a drive voltage via a touch detection processing unit 40.

When driving blocks of an interference portion 66 in the drive area R driven by the mutual capacitance type method, that is, when applying a drive signal Vcom to the drive electrodes COML of the interference portion 66, the touch detecting device 1D (more specifically, the control unit 11) stops driving of blocks in the drive area L driven by the self-capacitance type method until driving of the blocks of the interference portion 66 is completed as illustrated in FIG. 17. Therefore, the touch detecting device 1D can suppress an influence of an electric field crossing a boundary 65 between the drive areas L and R on touch detection in the other area when driving the blocks of the interference portion 66 similarly to the touch detecting devices 1 and 1A. The present embodiment drives the blocks of the drive electrodes COML belonging to the two drive areas L and R using different methods. The same applies to the case where the touch detecting device 1D has three or more drive areas.

1-6. Sixth Embodiment

Figure 18:
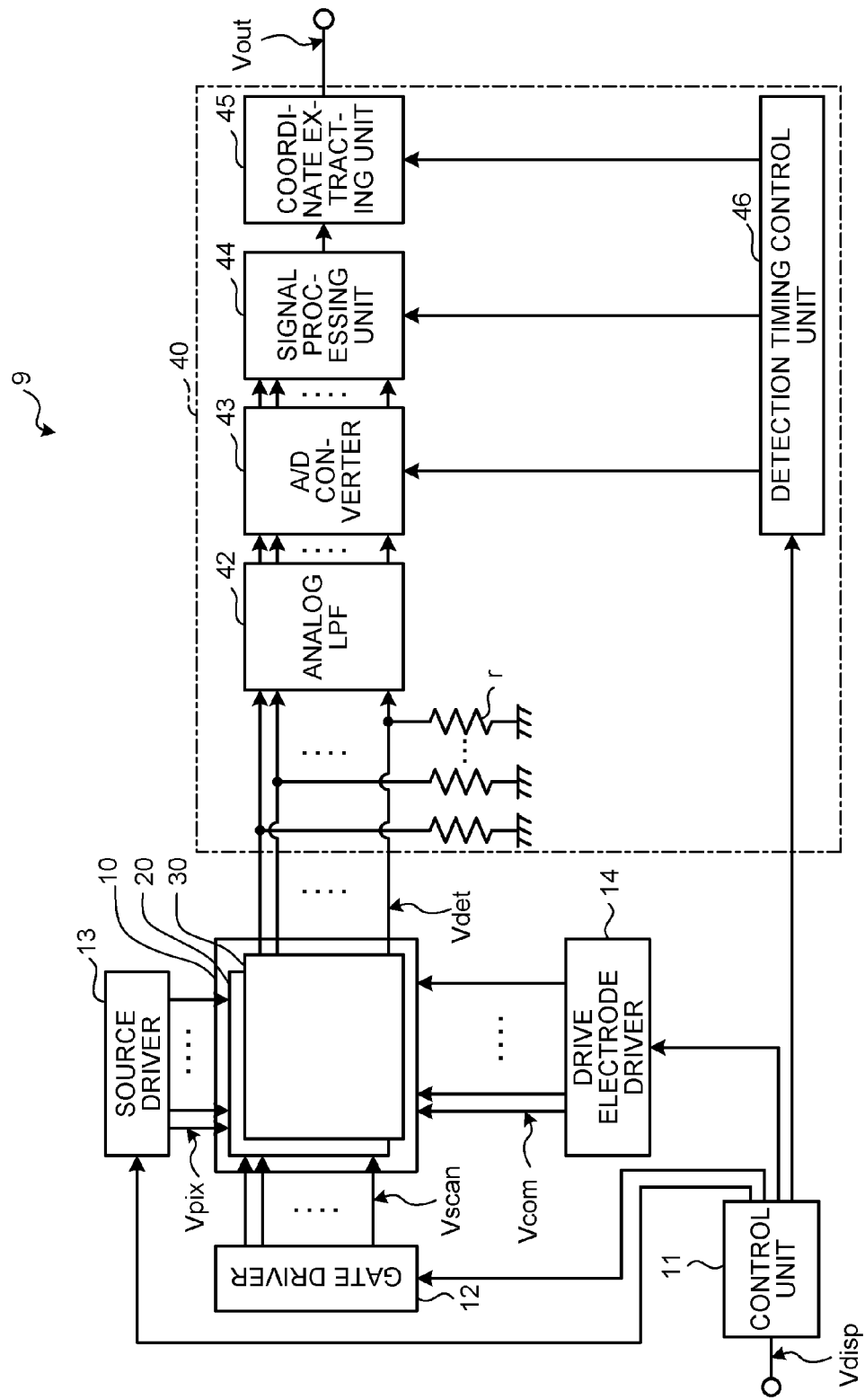
FIG. 18 is a block diagram of a display device with a touch detecting function according to a sixth embodiment.

FIG. 18 is a block diagram of a display device with a touch detecting function according to a sixth embodiment. The touch detecting devices 1, 1A, 1B, 1C, and 1D are applied to a touch detecting unit 30 of a display device 9 with a touch detecting function of the sixth embodiment illustrated in FIG. 18. As illustrated in FIG. 18, the display device 9 with a touch detecting function includes a display unit 10 with a touch detecting function, a control unit 11, a gate driver 12, a source driver 13, a drive electrode driver 14, and a touch detection processing unit 40. While the display device 9 with a touch detecting function shares the control unit 11 with the touch detecting devices 1, 1A, 1B, 1C, and 1D, the configuration of the present embodiment is not limited thereto.

In the display device 9 with a touch detecting function, the display unit 10 with a touch detecting function has a touch detecting function. The display unit 10 with a touch detecting function is what is called an in-cell device obtained by integrating a liquid-crystal display unit 20 provided with liquid-crystal display elements as display elements with the capacitive touch detecting unit 30. The display unit 10 with a touch detecting function may be what is called an on-cell device obtained by mounting the capacitive touch detecting unit 30 on the liquid-crystal display unit 20 provided with liquid-crystal display elements as display elements. The display unit 10 with a touch detecting function is formed of the touch detecting unit 30 serving as a touch detecting device and the liquid-crystal display unit 20 serving as a display device.

The liquid-crystal display unit 20 sequentially scans each horizontal line based on a scanning signal Vscan supplied from the gate driver 12, thereby performing display, which will be described later. The control unit 11 is a circuit that supplies control signals to the gate driver 12, the source driver 13, the drive electrode driver 14, and the touch detection processing unit 40 based on a video signal Vdisp supplied from the outside, thereby controlling these components so as to operate in synchronization with one another.

The gate driver 12 has a function to sequentially select a horizontal line to be a target of display drive in the display unit 10 with a touch detecting function based on the control signal supplied from the control unit 11. The source driver 13 is a circuit that supplies a pixel signal Vpix to each pixel Pix (sub-pixel SPix), which will be described later, in the display unit 10 with a touch detecting function based on the control signal supplied from the control unit 11. The source driver 13 generates a pixel signal by time-division multiplexing the pixel signals Vpix of a plurality of sub-pixels SPix in the liquid-crystal display unit 20 from a video signal of a horizontal line. The drive electrode driver 14 is a circuit that supplies a drive signal Vcom to a drive electrode COML provided to the display unit 10 with a touch detecting function as a drive electrode for display based on the control signal supplied from the control unit 11.

The touch detecting unit 30 illustrated in FIG. 18 sequentially scans each detection block based on the drive signal Vcom (touch drive signal Vcomt, which will be described later) supplied from the drive electrode driver 14, thereby performing touch detection. The touch detecting unit 30 outputs a touch detection signal Vdet for each detection block from a plurality of touch detection electrodes TDL, which will be described later, and supplies the touch detection signal Vdet to the touch detection processing unit 40.

The touch detection processing unit 40 is a circuit that detects whether a touch is made on the touch detecting unit 30 (the contact state described above) based on the control signal supplied from the control unit 11 and the touch detection signal Vdet supplied from the touch detecting unit 30 of the display unit 10 with a touch detecting function. If a touch is made, the touch detection processing unit 40 derives the coordinates of the touch in the touch detection area. The touch detection processing unit 40 includes an analog LPF 42, an A/D converter 43, a signal processing unit 44, a coordinate extracting unit 45, and a detection timing control unit 46.

The analog LPF 42 is a low-pass analog filter that receives the touch detection signal Vdet supplied from the touch detecting unit 30, removes high-frequency components (noise components) included in the touch detection signal Vdet, and extracts and outputs touch components. A resistance R that supplies a direct-current (DC) potential (0 V) is arranged between each input terminal of the analog LPF 42 and the ground. Instead of the resistance R, a switch may be provided, for example. In this case, the switch is turned on at predetermined time, thereby supplying the DC potential (0 V).

The A/D converter 43 is a circuit that samples the analog signal output from the analog LPF 42, thereby converting the analog signal into a digital signal at a timing synchronized with the drive signal Vcom. The signal processing unit 44 includes a digital filter that removes high-frequency components (noise components) higher than the frequency at which the touch drive signal Vcomt is sampled in the output signal of the A/D converter 43, thereby extracting touch components. The signal processing unit 44 is a logic circuit that detects whether a touch is made on the touch detecting unit 30 based on the output signal from the A/D converter 43. The coordinate extracting unit 45 is a logic circuit that derives, when a touch is detected by the signal processing unit 44, the touch panel coordinates of the touch. The detection timing control unit 46 performs control such that the A/D converter 43, the signal processing unit 44, and the coordinate extracting unit 45 operate in synchronization with one another.

Figure 19:
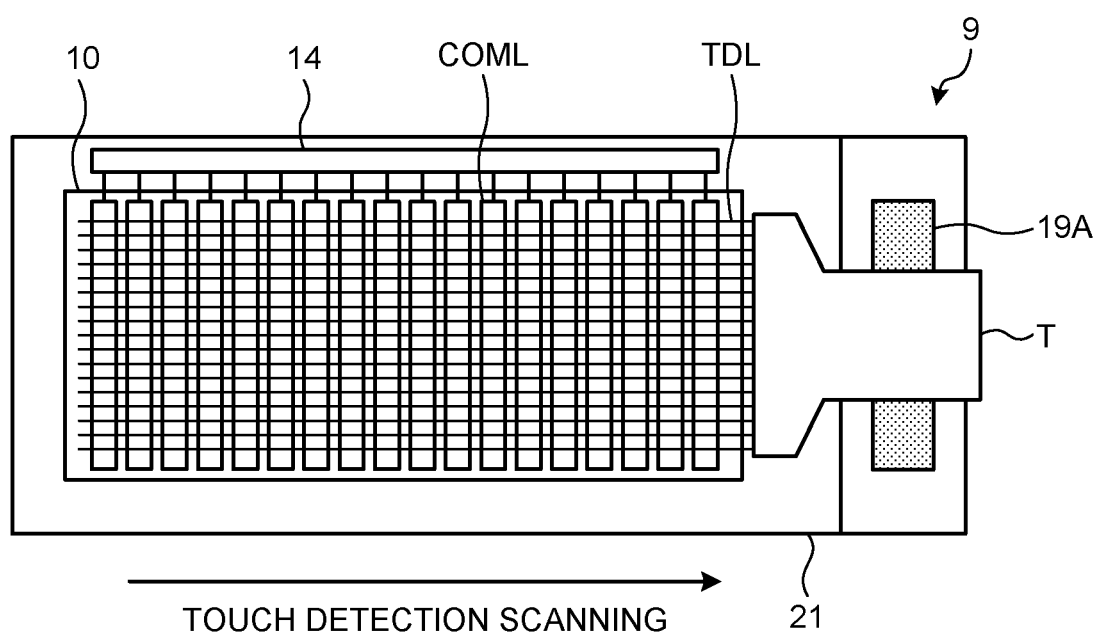
FIG. 19 is a schematic of an example of a module on which the display device with a touch detecting function is mounted.
Figure 20:
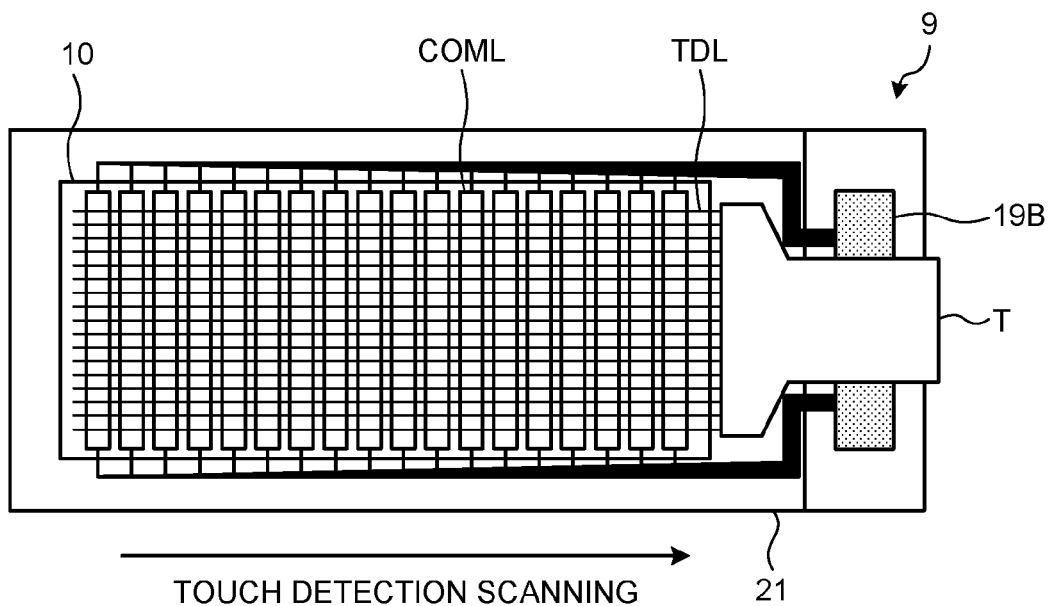
FIG. 20 is a schematic of another example of the module on which the display device with a touch detecting function is mounted.

FIGS. 19 and 20 are schematics of examples of a module on which the display device with a touch detecting function is mounted. To mount the display device 9 with a touch detecting function on the module, the drive electrode driver 14 may be formed on a TFT substrate 21, which is a glass substrate, as illustrated in FIG. 19.

As illustrated in FIG. 19, the display device 9 with a touch detecting function includes the display unit 10 with a touch detecting function, the drive electrode driver 14, and a chip on glass (COG) 19A. FIG. 19 schematically illustrates the display unit 10 with a touch detecting function including the drive electrodes COML and the touch detection electrodes TDL formed to cross the drive electrodes COML in a grade separated manner in a direction perpendicular to the surface of the TFT substrate, which will be described later. The drive electrodes COML are formed along the short-side direction of the display unit 10 with a touch detecting function, whereas the touch detection electrodes TDL are formed along the long-side direction of the display unit 10 with a touch detecting function. The output terminal of the touch detection electrodes TDL is coupled to the touch detection processing unit 40 mounted on the outside of the module via a terminal T which is provided on the short side of the display unit 10 with a touch detecting function and is formed of a flexible substrate or the like. The drive electrode driver 14 is formed on the TFT substrate 21, which is a glass substrate. The COG 19A is a chip mounted on the TFT substrate 21 and includes circuits required for a display operation, such as the control unit 11, the gate driver 12, and the source driver 13 illustrated in FIG. 18. The display device 9 with a touch detecting function may have a COG 19B integrated with the drive electrode driver 14 as illustrated in FIG. 20.

As illustrated in FIG. 20, the display device 9 with a touch detecting function includes the COG 19B. The COG 19B illustrated in FIG. 20 includes the drive electrode driver 14 besides the circuits required for the display operation described above. Integration of the drive electrode driver 14 into the COG 19B can reduce the size of the frame in the display device 9 with a touch detecting function illustrated in FIG. 20. The drive electrodes COML may be formed along the long-side direction of the display unit 10 with a touch detecting function, and the touch detection electrodes TDL may be formed along the short-side direction of the display unit 10 with a touch detecting function. This can reduce routing of the wiring from each drive electrode to the COG 19B when the drive electrode driver is embedded in the COG 19B.

The following describes an exemplary configuration of the display unit 10 with a touch detecting function in detail.

Figure 21:
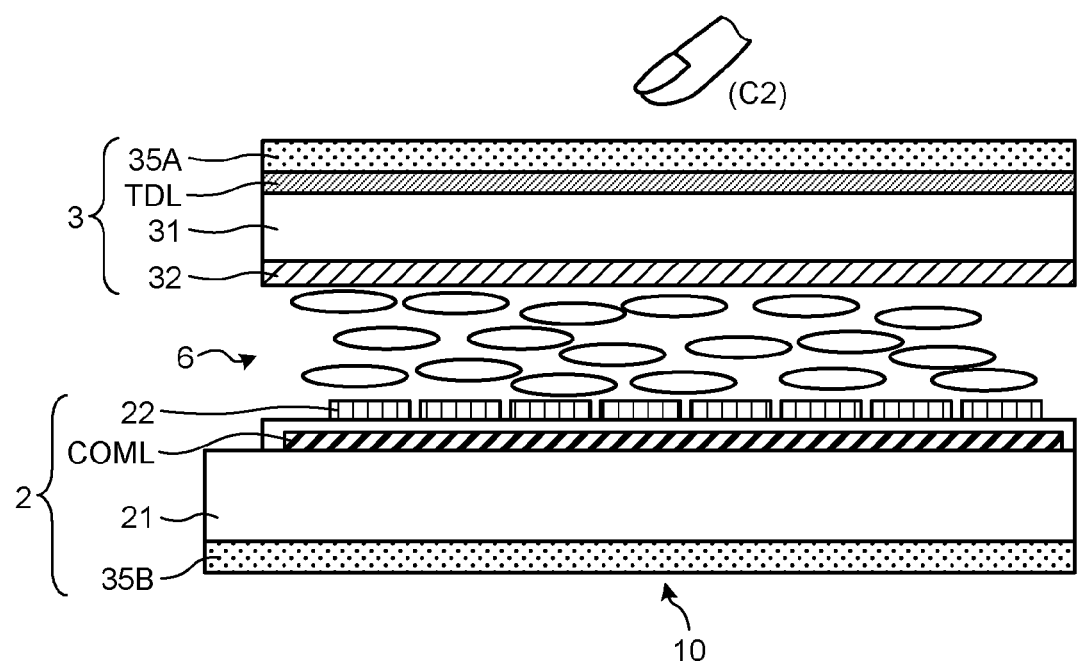
FIG. 21 is a sectional view of a schematic sectional structure of a display device with a touch detecting function.
Figure 22:
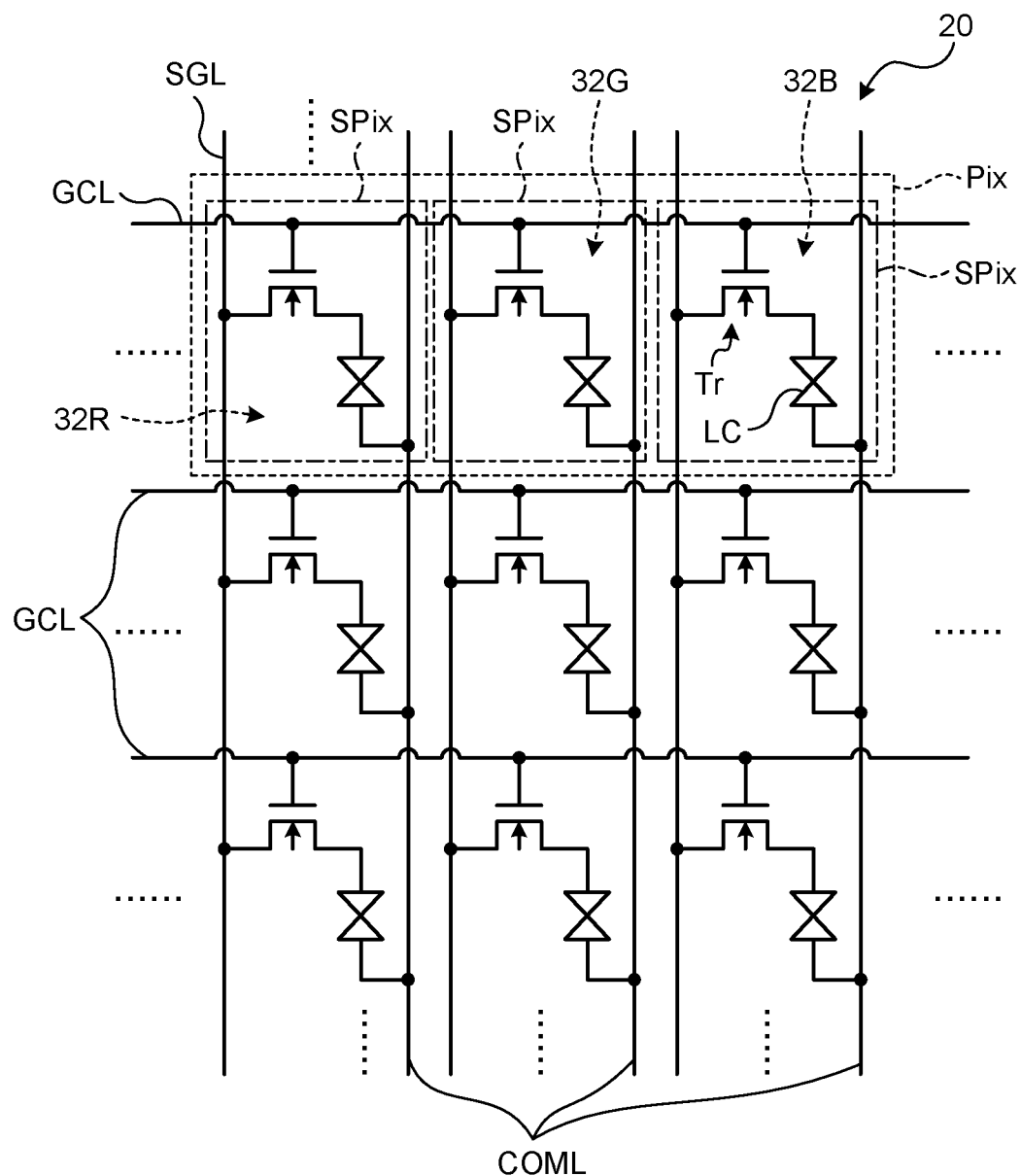
FIG. 22 is a circuit diagram of a pixel array in the display device with a touch detecting function.

FIG. 21 is a sectional view of a schematic sectional structure of the display unit with a touch detecting function. FIG. 22 is a circuit diagram of a pixel array in the display unit with a touch detecting function. The display unit 10 with a touch detecting function includes a pixel substrate 2, a counter substrate 3, and a liquid-crystal layer 6. The counter substrate 3 is arranged in a manner facing the surface of the pixel substrate 2 in a perpendicular direction. The liquid-crystal layer 6 is inserted between the pixel substrate 2 and the counter substrate 3.

The pixel substrate 2 includes the TFT substrate 21, a plurality of pixel electrodes 22, a plurality of drive electrodes COML, and an insulation layer 24. The TFT substrate 21 serves as a circuit board. The pixel electrodes 22 are arranged in a matrix on the TFT substrate 21. The drive electrodes COML are formed between the TFT substrate 21 and the pixel electrodes 22. The insulation layer 24 provides electrical insulation between the pixel electrodes 22 and the drive electrodes COML. The TFT substrate 21 is provided with a thin-film transistor (TFT) element Tr of each sub-pixel SPix, and wirings, such as a pixel signal line SGL and a scanning signal line GCL, as illustrated in FIG. 22. The pixel signal line SGL supplies the pixel signal Vpix to each pixel electrode 22, and the scanning signal line GCL drives each TFT element Tr. The pixel signal line SGL extends on a plane parallel to the surface of the TFT substrate 21 and supplies the pixel signal used to display an image to a pixel. The liquid-crystal display unit 20 illustrated in FIG. 22 includes a plurality of sub-pixels SPix arranged in a matrix. The sub-pixels Spix each include the TFT element Tr and a liquid-crystal element LC. The TFT element Tr is formed of a thin-film transistor and specifically of an n-channel metal oxide semiconductor (MOS) thin-film transistor in this example. The source of the TFT element Tr is coupled to the pixel signal line SGL, the gate is coupled to the scanning signal line GCL, and the drain is coupled to one end of the liquid-crystal element LC. The one end of the liquid-crystal element LC is coupled to the drain of the TFT element Tr, and the other end is coupled to the drive electrode COML.

The sub-pixel SPix is coupled to other sub-pixels SPix belonging to the same row in the liquid-crystal display unit 20 by the scanning signal line GCL. The scanning signal line GCL is coupled to the gate driver 12 and is supplied with the scanning signal Vscan from the gate driver 12. The sub-pixel SPix is further coupled to other sub-pixels SPix belonging to the same column in the liquid-crystal display unit 20 by the pixel signal line SGL. The pixel signal line SGL is coupled to the source driver 13 and is supplied with the pixel signal Vpix from the source driver 13. The sub-pixel SPix is further coupled to the other sub-pixels Spix belonging to the same column in the liquid-crystal display unit 20 by the drive electrode COML. The drive electrode COML is coupled to the drive electrode driver 14 and is supplied with the drive signal Vcom from the drive electrode driver 14. In other words, a plurality of sub-pixels SPix belonging to the same column share one drive electrode COML in this example. In the liquid-crystal display unit 20 illustrated in FIG. 21, the drive electrode COML is parallel to the pixel signal line SGL. The drive electrode COML may be parallel to the scanning signal line GCL.

The gate driver 12 illustrated in FIG. 18 applies the scanning signal Vscan to the gates of the TFT elements Tr of the sub-pixels SPix via the scanning signal line GCL illustrated in FIG. 22. Thus, the gate driver 12 sequentially selects a row (a horizontal line) out of the sub-pixels SPix arranged in a matrix in the liquid-crystal display unit 20 as a target of display drive. The source driver 13 illustrated in FIG. 18 supplies the pixel signal Vpix to the sub-pixels SPix constituting the horizontal line sequentially selected by the gate driver 12 via the pixel signal line SGL illustrated in FIG. 22. These sub-pixels SPix perform display of the horizontal line based on the supplied pixel signal Vpix. The drive electrode driver 14 illustrated in FIG. 18 applies the drive signal Vcom to drive the drive electrode COML illustrated in FIG. 21 and FIG. 22.

As described above, the gate driver 12 is driven to perform time-division line-sequential scanning on the scanning signal line GCL, thereby sequentially selecting a horizontal line in the liquid-crystal display unit 20. The source driver 13 supplies the pixel signal Vpix to the pixels Pix belonging to the horizontal line, thereby performing display of the horizontal line in the liquid-crystal display unit 20. To perform the display operation, the drive electrode driver 14 applies the drive signal Vcom to the block including the drive electrode COML corresponding to the horizontal line.

The counter substrate 3 includes a glass substrate 31 and a color filter 32 formed on one surface of the glass substrate 31. The touch detection electrode TDL serving as the detection electrode of the touch detecting unit 30 is formed on the other surface of the glass substrate 31. A polarization plate 35A is provided on the touch detection electrode TDL.

The color filter 32 includes color areas 32R, 32G, and 32B colored with three colors of red (R), green (G), and blue (B), respectively. The color filter 32 faces the COG 19 in a direction perpendicular to the TFT substrate 21 and overlaps with the COG 19 viewed in a direction perpendicular to the surface of the TFT substrate 21. In the color filter 32, color filters colored with the three colors of red (R), green (G), and blue (B) are cyclically arranged, thereby associating the sub-pixels SPix illustrated in FIG. 22 with the color areas 32R, 32G, and 32B colored with the three colors of red (R), green (G), and blue (B), respectively. In addition, the color areas 32R, 32G, and 32B are associated with the pixel Pix as a group. The color filter 32 faces the liquid-crystal layer 6 in the direction perpendicular to the TFT substrate 21. The color filter 32 may have another color combination as long as the color filters are colored with different colors.

In the present embodiment, the drive electrode COML serving as a drive electrode for display functions as a common electrode (a common drive electrode) of the liquid-crystal display unit 20 and as a drive electrode of the touch detecting unit 30, more specifically, of the touch detecting devices 1, 1A, etc. In the present embodiment, one drive electrode COML is arranged in a manner corresponding to one pixel electrode 22 (pixel electrodes 22 constituting one row). The insulation layer 24 provides electrical insulation between the pixel electrodes 22 and the drive electrodes COML and between the pixel electrodes 22 and the pixel signal lines SGL formed on the surface of the TFT substrate 21. The drive electrodes COML face the pixel electrodes 22 in the direction perpendicular to the surface of the TFT substrate 21. The drive electrodes COML extend in a direction parallel to the direction in which the scanning signal lines GCL extend. The drive electrode driver 14 applies the drive signal Vcom in an AC rectangular waveform to the drive electrodes COML via a contact conductive pillar having electrical conductivity, which is not illustrated.

The liquid-crystal layer 6 modulates light passing therethrough depending on the state of an electric field. The liquid-crystal layer 6 is used for, for example, a liquid-crystal display device of lateral electric-field mode, such as fringe field switching (FFS) and in-plane switching (IPS). An orientation film may be provided between the liquid-crystal layer 6 and the pixel substrate 2 and between the liquid-crystal layer 6 and the counter substrate 3 illustrated in FIG. 21. In the present embodiment, an orientation film is provided between the liquid-crystal layer 6 and the pixel substrate 2 and between the liquid-crystal layer 6 and the counter substrate 3, and an incident-side polarization plate 35B is arranged on the lower surface of the pixel substrate 2.

The drive electrode COML corresponds to a specific example of a "drive electrode" in the present application. The touch detection electrode TDL corresponds to a specific example of a "detection electrode" in the present application.

The following describes an operation and advantages of the display device 9 with a touch detecting function according to the sixth embodiment.

Figure 23:
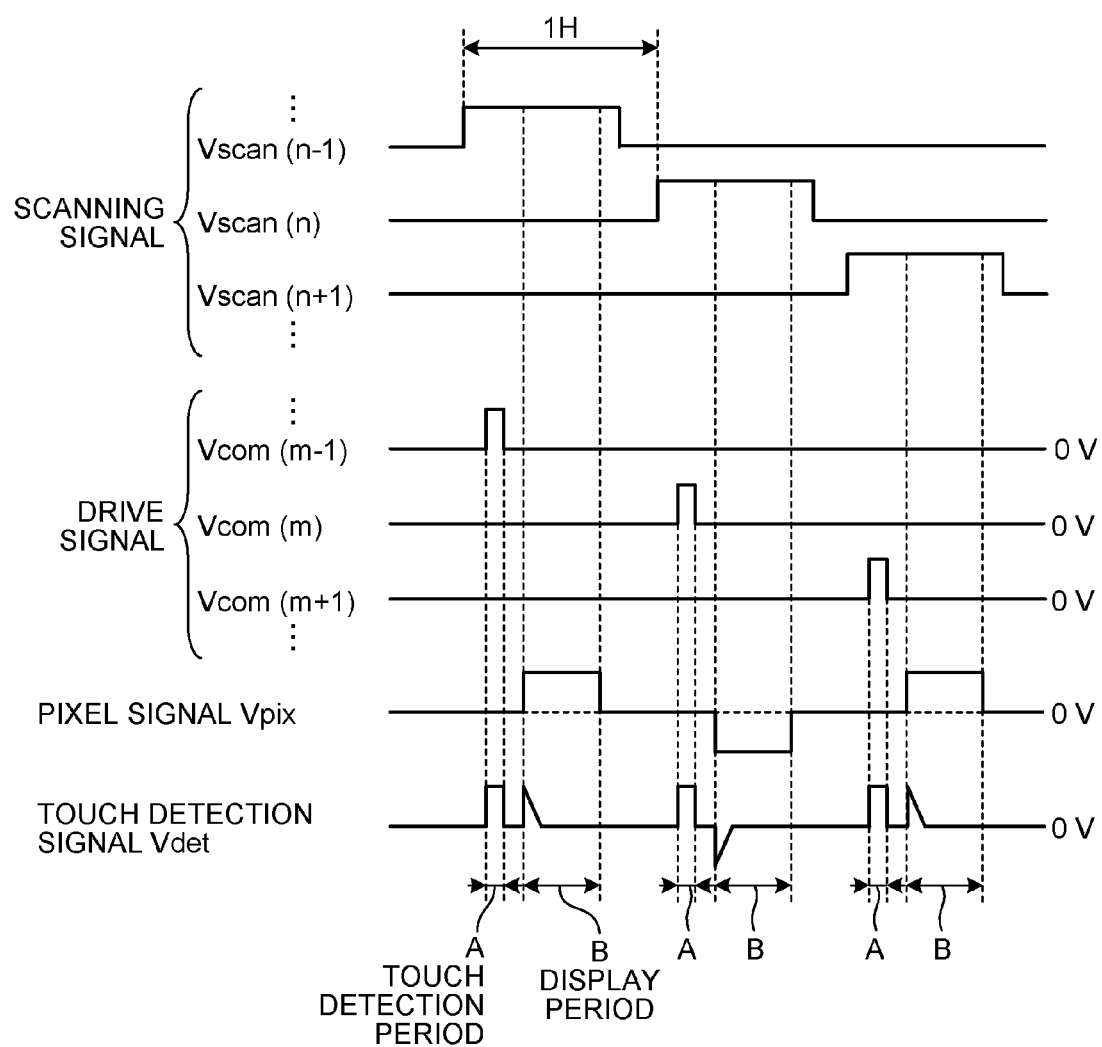
FIG. 23 is a timing waveform chart of an exemplary operation of the display device with a touch detecting function according to the sixth embodiment.

FIG. 23 is a timing waveform chart of an exemplary operation of the display device with a touch detecting function according to the sixth embodiment. The drive electrode COML functions as a common drive electrode of the liquid-crystal display unit 20 and as a drive electrode of the touch detecting unit 30. Thus, the drive signal Vcom may possibly affect both the liquid-crystal display unit 20 and the touch detecting unit 30. To address this, the drive signal Vcom is applied to the drive electrode COML separately in a display period B to perform a display operation and in a touch detection period A to perform a touch detection operation. The drive electrode driver 14 applies the drive signal Vcom as a display drive signal in the display period B to perform a display operation. The drive electrode driver 14 applies the drive signal Vcom as a touch drive signal in the touch detection period A to perform a touch detection operation. In the description below, the drive signal Vcom serving as the display drive signal is referred to as a display drive signal Vcomd, whereas the drive signal Vcom serving as the touch drive signal is referred to as a touch drive signal Vcomt.

Based on the video signal Vdisp supplied from the outside, the control unit 11 supplies control signals to the gate driver 12, the source driver 13, the drive electrode driver 14, and the touch detection processing unit 40, thereby controlling these units so as to operate in synchronization with one another. The gate driver 12 supplies the scanning signal Vscan to the liquid-crystal display unit 20 in the display period B, thereby sequentially selecting a horizontal line to be a target of display drive. The source driver 13 supplies the pixel signal Vpix to each pixel Pix constituting the horizontal line selected by the gate driver 12 in the display period B.

In the display period B, the drive electrode driver 14 applies the display drive signal Vcomd to a drive electrode block relating to the horizontal line. In the touch detection period A, the drive electrode driver 14 sequentially applies the touch drive signal Vcomt with a frequency higher than that of the display drive signal Vcomd to a drive electrode block relating to the touch detection operation, thereby sequentially selecting one detection block. The display unit 10 with a touch detecting function performs a display operation based on the signals supplied from the gate driver 12, the source driver 13, and the drive electrode driver 14 in the display period B. The display unit 10 with a touch detecting function performs a touch detection operation based on the signal supplied from the drive electrode driver 14 and outputs the touch detection signal Vdet from the touch detection electrode TDL in the touch detection period A. The analog LPF 42 amplifies and outputs the touch detection signal Vdet. The A/D converter 43 converts the analog signal output from the analog LPF 42 into a digital signal at a timing synchronized with the touch drive signal Vcomt. The signal processing unit 44 detects whether a touch is made on the touch detecting unit 30 based on the output signal from the A/D converter 43. The coordinate extracting unit 45 derives, when a touch is detected by the signal processing unit 44, the touch panel coordinates of the touch and outputs an output signal Vout. The control unit 11 controls the detection timing control unit 46 to change the sampling frequency of the touch drive signal Vcomt.

The following describes a specific operation of the display device 9 with a touch detecting function. As illustrated in FIG. 23, the liquid-crystal display unit 20 sequentially scans each horizontal line of successive scanning signal lines GCL of the (n−1)-th row, the n-th row, and the (n+1)-th row among the scanning signal lines GCL based on the scanning signal Vscan supplied from the gate driver 12, thereby performing display. Similarly, the drive electrode driver 14 supplies the drive signal Vcom to successive drive electrodes COML of the (m−1)-th column, the m-th column, and the (m+1)-th column among the drive electrodes COML of the display unit 10 with a touch detecting function based on the control signal supplied from the control unit 11.

As described above, the display device 9 with a touch detecting function performs the touch detection operation (touch detection period A) and the display operation (display period B) in a time-division manner in each display horizontal period 1H. In the touch detection operation, the display device 9 with a touch detecting function selects a different drive electrode COML and applies the drive signal Vcom thereto in each display horizontal period 1H, thereby performing scanning for touch detection. The following describes the operation in greater detail. The gate driver 12 applies the scanning signal Vscan to the scanning signal line GCL of the (n−1)-th row, thereby changing a scanning signal Vscan(n−1) from a low level to a high level. This starts a display horizontal period 1H.

In the touch detection period A, the drive electrode driver 14 applies the drive signal Vcom to the drive electrode COML of the (m−1)-th column, thereby changing a drive signal Vcom(m−1) from a low level to a high level. The drive signal Vcom(m−1) is transmitted to the touch detection electrode TDL via capacitance, thereby changing the touch detection signal Vdet. When the drive signal Vcom (m−1) changes from the high level to the low level, the touch detection signal Vdet changes in the same manner. The waveform of the touch detection signal Vdet in the touch detection period A corresponds to the touch detection signal Vdet in the basic principle of touch detection described above. The A/D converter 43 carries out A/D conversion on the touch detection signal Vdet in the touch detection period A, thereby performing touch detection. Thus, the display device 9 with a touch detecting function performs touch detection of one detection line.

In the display period B, the source driver 13 applies the pixel signal Vpix to the pixel signal line SGL, thereby performing display of a horizontal line. As illustrated in FIG. 23, the change in the pixel signal Vpix is transmitted to the touch detection electrode TDL via parasitic capacitance, thereby changing the touch detection signal Vdet. In the display period B, however, the A/D converter 43 carries out no A/D conversion, thereby making it possible to suppress an influence of the change in the pixel signal Vpix on touch detection. After the source driver 13 completes supplying the pixel signal Vpix, the gate driver 12 changes the scanning signal Vscan(n−1) of the scanning signal line GCL of the (n−1)-th row from the high level to the low level. Thus, this display horizontal period 1H is terminated.

Subsequently, the gate driver 12 applies the scanning signal Vscan to the scanning signal line GCL of the n-th row, which is different from the previous scanning signal line GCL, thereby changing a scanning signal Vscan(n) from a low level to a high level. This starts the next display horizontal period 1H.

In the subsequent touch detection period A, the drive electrode driver 14 applies the drive signal Vcom to the drive electrode COML of the m-th column, which is different from the previous drive electrode COML. The A/D converter 43 carries out A/D conversion on the change in the touch detection signal Vdet, thereby performing touch detection of one detection line.

In the display period B, the source driver 13 applies the pixel signal Vpix to the pixel signal line SGL, thereby performing display of a horizontal line. The display device 9 with a touch detecting function according to the present embodiment performs dot inversion drive. Thus, the polarity of the pixel signal Vpix applied by the source driver 13 is inverted from that in the first display horizontal period 1H. After the display period B is terminated, this display horizontal period 1H is terminated.

By repeating the operation described above, the display device 9 with a touch detecting function performs a display operation by scanning the entire display surface and performs a touch detection operation by scanning the entire touch detection surface.

In one display horizontal period 1H, the display device 9 with a touch detecting function performs the touch detection operation in the touch detection period A and performs the display operation in the display period B. Because the touch detection operation and the display operation are performed separately in the respective periods, the display device 9 with a touch detecting function can perform both the display operation and the touch detection operation in a single display horizontal period 1H. In addition, the display device 9 with a touch detecting function can suppress an influence of the display operation on the touch detection. Because the display device 9 with a touch detecting function according to the sixth embodiment is provided with the touch detecting devices 1, 1A, etc., it can provide advantages similar to those of the touch detecting devices 1, 1A, etc. The display device 9 with a touch detecting function does not necessarily perform the display operation and the touch detection operation in one display horizontal period 1H. The display device 9 with a touch detecting function, for example, may optionally set the touch detection period A and the display period B in one frame period to perform display of one screen and perform the touch detection operation and the display operation in a time-division manner.

Modification

Figure 24:
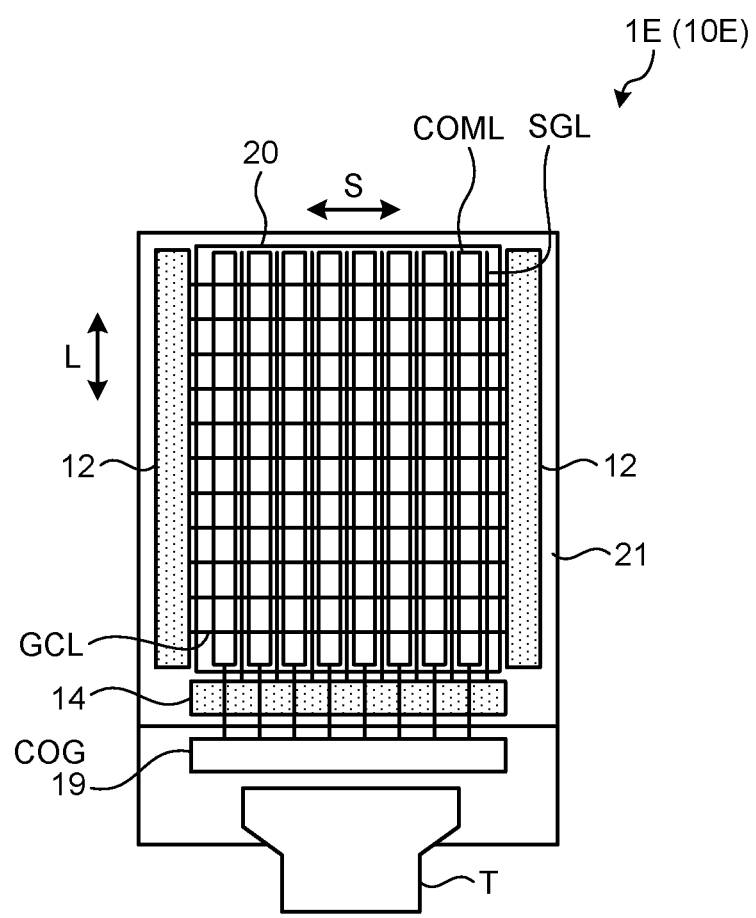
FIG. 24 is a schematic of an example of a module on which a display device with a touch detecting function according to a modification is mounted.

FIG. 24 is a schematic of an example of a module on which a display device with a touch detecting function according to a modification is mounted. The control system of a display device 1E with a touch detecting function is the same as that of the display device 9 with a touch detecting function illustrated in FIG. 18. As illustrated in FIG. 24, the display device 1E with a touch detecting function includes a liquid-crystal display unit 20, a drive electrode driver 14, and a COG 19. The COG 19 includes a source driver 13. The drive electrode driver 14 is formed on a TFT substrate 21, which is a glass substrate. The COG 19 is a chip mounted on the TFT substrate 21 and includes circuits required for a display operation, such as the control unit 11 and the source driver 13 illustrated in FIG. 18. The display device 1E with a touch detecting function may have the COG 19 including circuits, such as the drive electrode driver 14 and the gate driver 12.

In a display unit 10E with a touch detecting function, drive electrodes COML and scanning signal lines GCL coupled to the gate driver 12 are formed to cross each other in a grade separated manner in a direction perpendicular to the surface of the TFT substrate 21. In the display unit 10E with a touch detecting function, pixel signal lines SGL are formed not to cross the drive electrodes COML but to extend in a direction parallel to the drive electrodes COML viewed in the direction perpendicular to the surface of the TFT substrate 21.

The drive electrodes COML are formed along the long-side direction of the display unit 10E with a touch detecting function, whereas touch detection electrodes TDL are formed along the short-side direction of the display unit 10E with a touch detecting function. The output terminal of the touch detection electrodes TDL is provided on the short side of the display unit 10E with a touch detecting function. The output terminal is coupled to the touch detection processing unit 40 (refer to FIG. 18) mounted on the outside of the module via a terminal T formed of a flexible substrate or the like.

As described above, the display device 1E with a touch detecting function illustrated in FIG. 24 outputs the touch detection signal Vdet from the short side of the display unit 10E with a touch detecting function. This facilitates routing of the wiring to couple the display device 1E with a touch detecting function to the touch detection processing unit 40 via the terminal T.

The display device 1E with a touch detecting function performs display scanning in a direction parallel to a long-side direction L of the display unit 10E with a touch detecting function. The display device 1E with a touch detecting function sequentially applies the drive signal Vcom to the drive electrodes COML in a touch detection operation, thereby performing line-sequential scanning on each detection line. In other words, the display device 1E with a touch detecting function performs touch detection scanning in a direction parallel to a short-side direction S of the display unit 10E with a touch detecting function. In the display device 1E with a touch detecting function, the direction of the display scanning is different from that of the touch detection scanning.

While the explanation has been made of the embodiments of various types of devices to which the present application is applied, the embodiments are not intended to limit the present application, and various changes can be made in the embodiments. In the embodiments above, for example, perform scanning by driving the drive electrodes COML one by one. Alternatively, the embodiments above may perform scanning by driving a predetermined number of drive electrodes COML at a time and shifting the drive electrodes COML one by one.

Instead of the liquid-crystal display unit 20 in various types of modes described above, the display unit 10 with a touch detecting function may be formed by integrating a liquid-crystal display unit in various types of modes, such as a twisted nematic (TN) mode, a vertical alignment (VA) mode, and an electrically controlled birefringence (ECB) mode, with a touch detecting unit. The display unit 10 with a touch detecting function may be configured with lateral electric-field mode liquid crystals. In the explanation of the embodiments above, the display device 9 with a touch detecting function is what is called an in-cell device formed by integrating the liquid-crystal display unit 20 with the capacitive touch detecting unit 30. Alternatively, the display device 9 with a touch detecting function may be formed by attaching a capacitive touch detecting device to a liquid-crystal display device, for example.

2. APPLICATION EXAMPLES

FIG. 25 to FIG. 31 are schematics of examples of an electronic apparatus to which the touch detecting device according to the present application is applied. The following describes application examples of the touch detecting devices 1, 1A, etc. with reference to FIG. 25 to FIG. 31. The touch detecting devices 1, 1A, etc. are applicable to electronic apparatuses of various fields, such as television apparatuses, digital cameras, notebook personal computers, portable electronic apparatuses including mobile phones, and video cameras. In other words, the touch detecting devices 1, 1A, etc. are applicable to electronic apparatuses of various fields that display video signals received from the outside or video signals generated inside thereof as an image or video.

First Application Example

Figure 25:
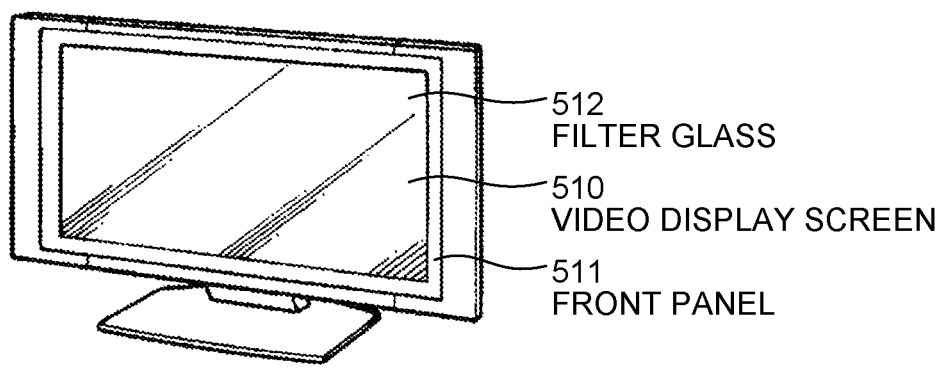
FIG. 25 is a schematic of an example of an electronic apparatus to which the touch detecting device according to the present application is applied.

An electronic apparatus illustrated in FIG. 25 is a television apparatus to which the touch detecting devices 1, 1A, etc. are applied. The television apparatus has a video display screen 510 including a front panel 511 and a filter glass 512, for example. The video display screen 510 includes the touch detecting devices 1, 1A, etc.

Second Application Example

Figure 26:
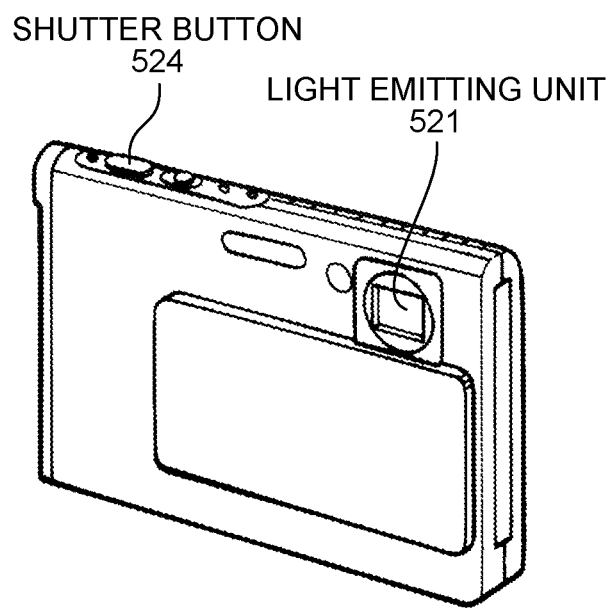
FIG. 26 is a schematic of an example of an electronic apparatus to which the touch detecting device according to the present application is applied.
Figure 27:
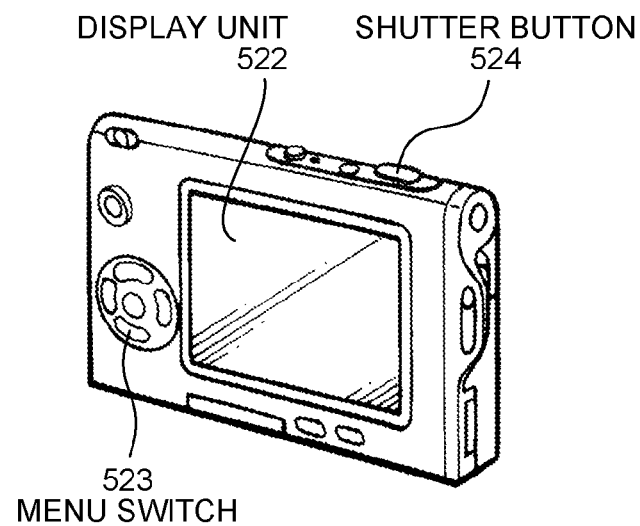
FIG. 27 is a schematic of an example of an electronic apparatus to which the touch detecting device according to the present application is applied.

An electronic apparatus illustrated in FIG. 26 and FIG. 27 is a digital camera to which the touch detecting devices 1, 1A, etc. are applied. The digital camera includes a light emitting unit 521 for flash, a display unit 522, a menu switch 523, and a shutter button 524, for example. The display unit 522 includes the touch detecting devices 1, 1A, etc.

Third Application Example

Figure 28:
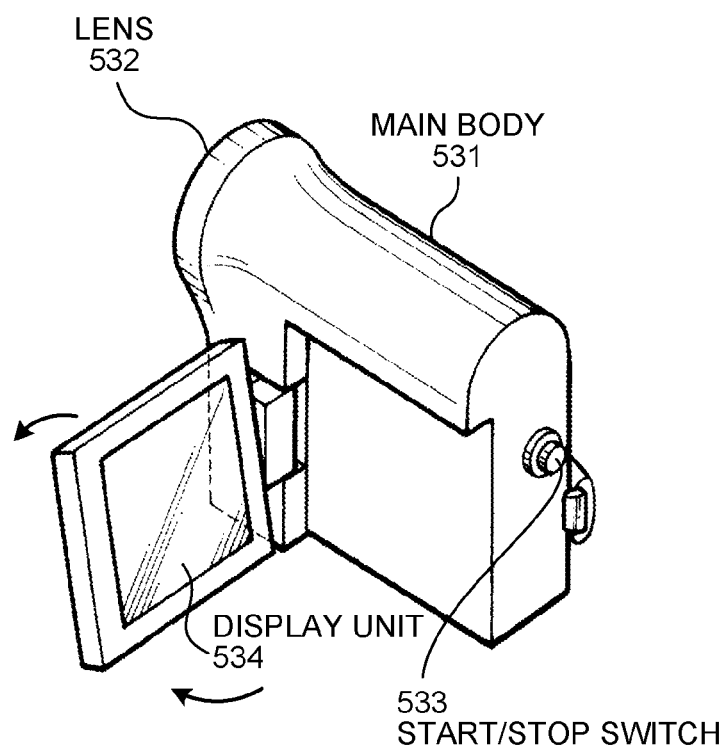
FIG. 28 is a schematic of an example of an electronic apparatus to which the touch detecting device according to the present application is applied.

An electronic apparatus of which the exterior appearance is illustrated in FIG. 28 is a video camera to which the touch detecting devices 1, 1A, etc. are applied. The video camera includes a main body 531, a lens 532 provided to the front side surface of the main body 531 and used for photographing a subject, a start/stop switch 533 used in photographing, and a display unit 534, for example. The display unit 534 includes the touch detecting devices 1, 1A, etc.

Fourth Application Example

Figure 29:
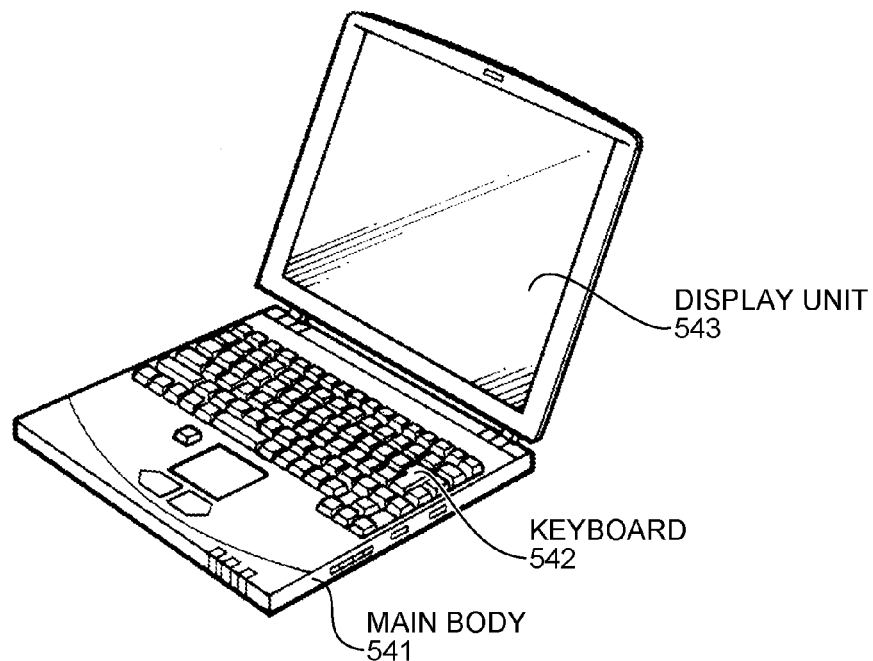
FIG. 29 is a schematic of an example of an electronic apparatus to which the touch detecting device according to the present application is applied.

An electronic apparatus illustrated in FIG. 29 is a notebook personal computer to which the touch detecting devices 1, 1A, etc. are applied. The notebook personal computer includes a main body 541, a keyboard 542 used for input of characters or the like, and a display unit 543 that displays an image, for example. The display unit 543 includes the touch detecting devices 1, 1A, etc.

Fifth Application Example

Figure 30:
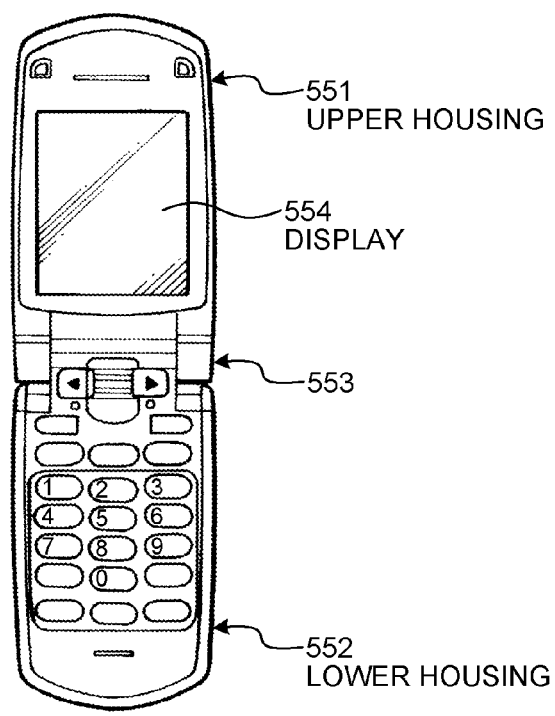
FIG. 30 is a schematic of an example of an electronic apparatus to which the touch detecting device according to the present application is applied.

An electronic apparatus illustrated in FIG. 30 is a mobile phone to which the touch detecting devices 1, 1A, etc. are applied. The mobile phone includes an upper housing 551 and a lower housing 552 connected by a connection (a hinge) 553, for example. The mobile phone further includes a display 554. The display 554 includes the touch detecting devices 1, 1A, etc.

Sixth Application Example

Figure 31:
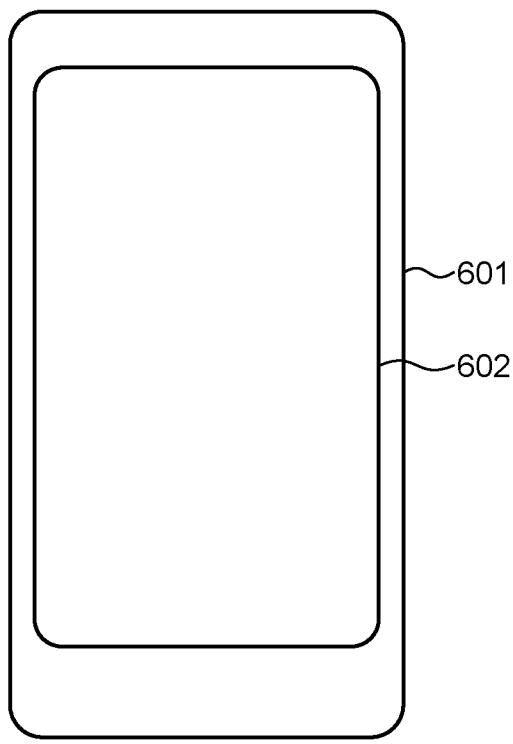
FIG. 31 is a schematic of an example of an electronic apparatus to which the touch detecting device according to the present application is applied.

An electronic apparatus illustrated in FIG. 31 is a mobile phone called a smartphone to which the touch detecting devices 1, 1A, etc. are applied. The mobile phone includes a touch panel 602 on the surface of a housing 601 having a substantially rectangular thin plate shape, for example. The touch panel 602 includes the touch detecting devices 1, 1A, etc.

3. ASPECTS OF THE PRESENT APPLICATION

The present application includes the following aspects.
(1) A touch detecting device comprising:
a first drive area and a second drive area each including a plurality of drive electrodes and a plurality of detection electrodes, the plurality of drive electrodes extending in a first direction, being arrayed in a second direction intersecting with the first direction, and being applied with a drive signal serving as a signal for detecting at least one of approach and contact of an object, the plurality of detection electrodes extending in the second direction, being arrayed in the first direction, and outputting a detection signal serving as a signal corresponding to a change in capacitance generated between the detection electrodes and the drive electrodes, the first drive area and the second drive area being arranged adjacent to each other in the second direction;

a boundary between the first drive area and the second drive area adjacent to each other; and a first predetermined area included in the first drive area and a second predetermined area included in the second drive area, wherein the first predetermined area and the second predetermined area face each other with the boundary interposed therebetween, and application of the drive signal to the drive electrodes arranged in the second drive area is stopped at a timing to apply the drive signal to the drive electrodes arranged in the first predetermined area, and application of the drive signal to the drive electrodes arranged in the first drive area is stopped at a timing to apply the drive signal to the second predetermined area.

(2) The touch detecting device according to (1), wherein application of the drive signal to all drive electrodes arranged in the second drive area is stopped at the timing to apply the drive signal to the drive electrodes arranged in the first predetermined area, and application of the drive signal to all drive electrodes arranged in the first drive area is stopped at the timing to apply the drive signal to the second predetermined area.

(3) The touch detecting device according to (1) or (2), wherein the detection electrodes belonging to each of the first drive area and the second drive area adjacent to each other are arranged at a same position on the boundary side.

(4) The touch detecting device according to any one of (1) to (3), wherein the first drive area and the second drive area are the same in size.

(5) The touch detecting device according to any one of (1) to (4), wherein the first predetermined area and the second predetermined area each have a dimension of equal to or larger than one-half of the dimension of the drive electrodes in the second direction.

(6) The touch detecting device according to any one of (1) to (5), wherein the drive signal is simultaneously applied to at least two of the drive electrodes in at least one drive area out of the first drive area and the second drive area.

(7) The touch detecting device according to any one of (1) to (5), wherein touch detection in parallel in the first drive area and the second drive area adjacent to each other is performed in a period when no drive signal is applied to the first drive area or the second drive area adjacent to each other.

(8) The touch detecting device according to any one of (1) to (6), wherein the detection electrodes of the first drive area are separated from the detection electrodes of the second drive area with the boundary interposed therebetween, the detection electrodes of the second drive area are separated from the detection electrodes of the first drive area with the boundary interposed therebetween, and the first drive area and the second drive area each include the detection electrodes.

(9) The touch detecting device according to any one of (1) to (8), wherein the sum of output from the detection electrodes of the first predetermined area and output from the detection electrodes of the second predetermined area is used as a detection signal when the drive signal is applied to the drive electrodes belonging to the first predetermined area and the drive electrodes belonging to the second predetermined area, and output from the detection electrodes of each of the first drive area and the second drive area is used as the detection signal when the drive signal is applied to the drive electrodes belonging to an area other than the first predetermined area and the second predetermined area.

(10) The touch detecting device according to any one of (1) to (8), wherein the detection signal alone from the detection electrodes of the first drive area or the detection electrodes of the second drive area is detected when the drive electrodes of the first predetermined area or the drive electrodes of the second predetermined area are driven.

(11) The touch detecting device according to any one of (1) to (10), wherein the first drive area and the second drive area are adjacent to each other in the second direction, an area corresponding to a predetermined number of the drive electrodes toward a first drive area side from the boundary is defined as the first predetermined area, and the number of the drive electrodes belonging to the first drive area is larger than that of the drive electrodes belonging to the second drive area, and sequentially applying the drive signal from a drive electrode arranged farthest from the boundary in the second direction out of the drive electrodes belonging to the first drive area to a drive electrode arranged near the boundary, and sequentially applying the drive signal from a drive electrode arranged nearest the boundary or a drive electrode arranged farthest from the boundary in the second direction out of the drive electrodes belonging to the second drive area to a drive electrode arranged away from the boundary are repeated.

(12) The touch detecting device according to any one of (1) to (11), wherein the dimension of the drive electrodes in the first direction is larger than the entire dimension of the first and second drive areas in the second direction.

(13) The touch detecting device according to any one of (1) to (12), wherein the drive electrodes and the detection electrodes belonging to at least one of the first drive area and the second drive area are driven by using a mutual capacitance type method and drives, and the drive electrodes and the detection electrodes belonging to a drive area not driven by the mutual capacitance type method are driven by using a self-capacitance type method.

(14) A display device with a touch detecting function comprising the touch detecting device according to any one of (1) to (13).

(15) A display apparatus with a touch detecting function comprising:

a touch detecting device including:

a first drive area and a second drive area each including a plurality of drive electrodes and a plurality of detection electrodes, the plurality of drive electrodes extending in a first direction, being arrayed in a second direction intersecting with the first direction, and being applied with a drive signal serving as a signal for detecting at least one of approach and contact of an object, the plurality of detection electrodes extending in the second direction, being arrayed in the first direction, and outputting a detection signal serving as a signal corresponding to a change in capacitance generated between the detection electrodes and the drive electrodes, the first drive area and the second drive area being arranged adjacent to each other in the second direction;

a boundary between the first drive area and the second drive area adjacent to each other; and a first predetermined area included in the first drive area and a second predetermined area included in the second drive area; and a display device integrated with the touch detecting device, wherein the first predetermined area and the second predetermined area face each other with the boundary interposed therebetween, and a direction of display scanning performed by the display device is different from a direction of touch detection scanning performed by the touch detecting device.

(16) An electronic apparatus comprising the touch detecting device according to any one of (1) to (13).

The present application can maintain excellent detection sensitivity and excellent position detection accuracy in touch detection and increase the detection speed.

Even when the drive signal is applied to the drive electrodes in one of the first predetermined area belonging to the first drive area and the second predetermined area belonging to the second drive area and electric fields of the drive electrodes cross the boundary, the touch detecting device according to the present application and the display device with a touch detecting function and the electronic apparatus including the touch detecting device can make the electric fields less likely to affect a touch detection operation on the other drive area because the other drive area is stopped. Thus, the present application can maintain excellent detection sensitivity and excellent position detection accuracy in touch detection. The present application can apply the drive signal to the drive electrodes arranged in the first drive area and the second drive area at the same timing. Thus, the present application can reduce the time required for touch detection in the entire touch detecting device, thereby increasing the detection speed.

The embodiments of the present application are not limited by the foregoing descriptions. Further, the components in the above described embodiments include components easily conceivable by those skilled in the art and components substantially identical, in other words, components that are within the range of equivalency. Furthermore, the components described above can be appropriately combined with one another. Moreover, various omissions, alternatives and variations of the components may be possible within the scope of the above embodiments.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch detecting device comprising:

a plurality of drive electrodes arranged in a first direction, in a first drive area and in a second drive area, the first drive area including a first boundary area and a first non-boundary area, and the second drive area including a second boundary area and a second non-boundary area, the first boundary area and the second boundary area being arranged adjacent to each other in the first direction; and a controller configured:

to supply a drive signal to a first number of the drive electrodes in the first non-boundary area, and to a second number of the drive electrodes in the second non-boundary area; and not to supply the drive signal to the first number of the drive electrodes in the first boundary area at a timing of supplying the drive signal to the second number of the drive electrodes in the second boundary area, wherein the first number is different from the second number.

2. The touch detecting device according to claim 1, wherein the controller is configured to supply the drive signal:

to the first number of the drive electrodes from the first non-boundary area toward the first boundary area; and to the second number of the drive electrodes from the second non-boundary area toward the second boundary area.

3. The touch detecting device according to claim 1, wherein the controller is configured to supply the drive signal:

to the first number of the drive electrodes from the first non-boundary area toward the first boundary area; and to the second number of the drive electrodes from the second boundary area toward the second non-boundary area.

4. The touch detecting device according to claim 1, wherein the controller is configured to not supply the drive signal to the first number of the drive electrodes in the first boundary area at the timing of supplying the drive signal to the second number of the drive electrodes arranged in the second boundary area.

5. The touch detecting device according to claim 4, wherein at least one of the plurality of the drive electrodes is overlapped by the first detection electrodes in the first boundary area and the second detection electrodes in the second boundary area.

6. The touch detecting device according to claim 1, further comprising a plurality of first detection electrodes in the first drive area, and a plurality of second detection electrodes in the second drive area, wherein one of the plurality of first detection electrodes is adjacent to one of the plurality of the second detection electrodes in the first direction.

7. The touch detecting device according to claim 1, further comprising a plurality of first detection electrodes in the first drive area, and a plurality of second detection electrodes in the second drive area, wherein a length of one of the plurality of drive electrodes in a second direction crossing the first direction is greater than a width of one of the first detection electrodes in the second direction plus a width of one of the second detection electrodes in the second direction.

8. The touch detecting device according to claim 1, wherein a total number of the plurality of the drive electrodes in the first drive area and a total number of the plurality of drive electrodes in the second drive area are same.

9. The touch detecting device according to claim 1,
a total number of the plurality of drive electrodes in the first drive area is different from a total number of the plurality of drive electrodes in the second drive area.

10. The touch detecting device according to claim 1, wherein the controller is configured to simultaneously supply the drive signal to the first number of the drive electrodes in the first non-boundary area, and to the second number of the drive electrodes in the second non-boundary area.

11. The touch detecting device according to claim 1, wherein
the controller is configured to receive a first signal and a second signal,
the first signal is a sum of a first output signal and a second output signal,
the first output signal is output at a timing to supply the drive signal to the first number of the drive electrodes in the first boundary area,
the second output signal is output at a timing to supply the drive signal to the second number of the drive electrodes in the second boundary area,
the second signal include each of a third output signal and a forth output signal,
the third output signal is output at a timing to supply the drive signal to the first number of the drive electrodes in the first non-boundary area,
the forth output signal is output at a timing to supply the drive signal to the second number of the drive electrodes in the second non-boundary area.

12. The touch detecting device according to claim 1, wherein the controller is configured to supply the drive signal to one of the plurality of drive electrodes in the first non-boundary area when the controller supplies the drive signal to the second number of drive electrodes in the second boundary area.

13. The touch detecting device according to claim 1, wherein
the drive electrodes in the first drive area are driven by using a mutual capacitance type method, and
the drive electrodes in the second drive area are driven by using a self-capacitance type method.

14. The touch detecting device according to claim 1, the controller includes a first driver and a second driver that is different from the first driver, wherein
the first driver is electrically connected to the plurality of drive electrodes in the first drive area, and is configured to supply each of the drive electrodes in the first drive area with the drive signal, and
the second driver is electrically connected to the plurality of the drive electrodes in the second drive area and is configured to supply each of the drive electrodes in the second drive area with the drive signal.

15. A display device with a touch detecting function comprising the touch detecting device according to claim 1.

16. An electronic apparatus comprising the touch detecting device according to claim 1.

* * * * *